United States Patent
Rudell

(10) Patent No.: US 10,950,059 B2
(45) Date of Patent: *Mar. 16, 2021

(54) SIGNAL ACTIVATED LIQUID RELEASE FOR VIRTUAL, MIXED AND AUGMENTED REALITY

(71) Applicant: Elliot A. Rudell, Franklin, TN (US)

(72) Inventor: Elliot A. Rudell, Franklin, TN (US)

(*) Notice: Subject to any disclaimer, the term of this patent is extended or adjusted under 35 U.S.C. 154(b) by 91 days.

This patent is subject to a terminal disclaimer.

(21) Appl. No.: 16/680,420

(22) Filed: Nov. 11, 2019

(65) Prior Publication Data
US 2020/0082636 A1    Mar. 12, 2020

Related U.S. Application Data

(63) Continuation-in-part of application No. 15/724,734, filed on Oct. 4, 2017, now Pat. No. 10,471,340.
(Continued)

(51) Int. Cl.
| | | |
|---|---|---|
| A63H 30/04 | (2006.01) | |
| A63H 33/00 | (2006.01) | |
| A63H 23/10 | (2006.01) | |
| G06T 19/00 | (2011.01) | |
| G06F 3/01 | (2006.01) | |
| A63F 13/213 | (2014.01) | |
| A63F 13/211 | (2014.01) | |
| A63F 13/245 | (2014.01) | |
| G07F 17/32 | (2006.01) | |
| G02B 27/01 | (2006.01) | |

(52) U.S. Cl.
CPC .......... *G06T 19/006* (2013.01); *A63F 13/211* (2014.09); *A63F 13/213* (2014.09); *A63F 13/245* (2014.09); *A63H 23/10* (2013.01); *A63H 30/04* (2013.01); *A63H 33/00* (2013.01); *G02B 27/017* (2013.01); *G06F 3/011* (2013.01); *G06F 3/017* (2013.01); *G07F 17/3237* (2013.01); *A63F 2250/0421* (2013.01); *A63F 2300/8082* (2013.01); *G02B 2027/0174* (2013.01)

(58) Field of Classification Search
CPC .... A63H 2200/00; A63H 23/00; A63H 23/10; A63H 23/12; A63H 33/00; A63H 30/04; A63F 13/245; A63F 9/00; A63F 9/18; A63F 2250/0407; A63F 2250/0421
See application file for complete search history.

(56) References Cited

U.S. PATENT DOCUMENTS 4,369,782 A * 1/1983 McGee ............... A42B 3/0406
                                                        2/410
4,526,366 A * 7/1985 Kenoun ............... A63B 67/00
                                                        273/349
(Continued)

*Primary Examiner* — Eugene L Kim
*Assistant Examiner* — Alyssa M Hylinski
(74) *Attorney, Agent, or Firm* — Shane V. Cortesi

(57) ABSTRACT

The present application describes liquid release of fluid, preferably water, onto the head or heads of a player or players of an electronic interactive game, which may incorporate virtual reality, mixed reality or augmented reality. In most embodiments, the gameset includes headgear that includes a liquid reservoir for dispensing a liquid on a player. The gameset may also include an electronic display to visually present imagery to the player, and a receiver that transmits a signal to a receiver coupled to the headgear to dispense liquid from the liquid reservoir onto a player.

16 Claims, 24 Drawing Sheets

Related U.S. Application Data

(60) Provisional application No. 62/404,004, filed on Oct. 4, 2016, provisional application No. 62/916,084, filed on Oct. 16, 2019.

(56) References Cited

U.S. PATENT DOCUMENTS

| | | | | |
|---|---|---|---|---|
| 4,813,680 A * | 3/1989 | Rudell | ............. | A63F 9/00 273/138.1 |
| 4,991,847 A * | 2/1991 | Rudell | ............. | A63F 9/00 273/138.1 |
| 5,197,292 A * | 3/1993 | McPherson | ............. | A42B 1/008 2/7 |
| 5,295,890 A * | 3/1994 | Myers | ............. | A63H 17/006 446/176 |
| 5,370,278 A * | 12/1994 | Raynie | ............. | A63H 33/00 222/144.5 |
| 5,411,269 A * | 5/1995 | Thomas | ............. | A63F 9/02 273/349 |
| 5,823,538 A * | 10/1998 | Goldfarb | ............. | A63F 7/0017 273/445 |
| 5,979,900 A * | 11/1999 | Goldfarb | ............. | A63F 7/0017 273/440 |
| 5,984,788 A * | 11/1999 | Lebensfeld | ............. | A63F 9/0291 463/51 |
| 5,992,853 A * | 11/1999 | Rudell | ............. | A63F 9/18 273/148 R |
| 5,993,428 A * | 11/1999 | Hardge | ............. | A42B 3/0406 2/422 |
| 6,050,099 A * | 4/2000 | Lopa | ............. | A42B 1/008 62/259.3 |
| 6,427,467 B1 * | 8/2002 | Bell | ............. | A42B 1/008 2/181.6 |
| 10,471,340 B2 * | 11/2019 | Rudell | ............. | A63F 9/0278 |
| 2006/0273188 A1 * | 12/2006 | Amron | ............. | B05B 3/0427 239/23 |
| 2007/0114301 A1 * | 5/2007 | Blake | ............. | A45F 3/16 239/327 |
| 2007/0284391 A1 * | 12/2007 | von Goeben | ............. | A63H 23/10 222/78 |
| 2012/0225645 A1 * | 9/2012 | Sivan | ............. | G08C 17/02 455/418 |
| 2014/0152531 A1 * | 6/2014 | Murray | ............. | G06F 1/1632 345/8 |
| 2014/0287806 A1 * | 9/2014 | Balachandreswaran | ............. | A63F 13/00 463/7 |
| 2015/0234189 A1 * | 8/2015 | Lyons | ............. | G02B 27/017 345/174 |
| 2015/0273502 A1 * | 10/2015 | Bell | ............. | B05B 9/0816 239/153 |
| 2018/0042327 A1 * | 2/2018 | Taylor | ............. | A42B 3/048 |
| 2019/0192965 A1 * | 6/2019 | Chapman | ............. | A63F 13/28 |

* cited by examiner

SIGNAL ACTIVATED LIQUID RELEASE FOR VIRTUAL, MIXED AND AUGMENTED REALITY

CROSS REFERENCE TO RELATED APPLICATION

This patent application is a continuation-in-part of U.S. patent application Ser. No. 15/724,734, entitled "Signal Beam Activated Water Release Game", filed Oct. 4, 2017, which claims the benefit under 35 USC 119 of U.S. Provisional Patent Application Ser. No. 62/404,004, entitled "Signal Beam Activated Water Release Game", filed Oct. 4, 2016. This patent application also claims the benefit under 35 USC 119 of U.S. Provisional Patent Application Ser. No. 62/916,084, entitled "SIGNAL ACTIVATED LIQUID RELEASE FOR VIRTUAL AND AUGMENTED REALITY GAMING," filed Oct. 16, 2019. The contents of all of the aforementioned are incorporated herein by reference in their entirety.

FIELD OF THE INVENTION

The invention of the present application is directed towards water toys and water gaming activities.

BACKGROUND INFORMATION

The inventor cited in this application co-invented a very popular toy called WETHEAD® (U.S. Pat. No. 4,813,680) that emits water as one of numerous plastic rods is manually removed to release stored water onto a wearer's head. Said patent is long-expired, and yet the simple plastic toy WETHEAD continues to be a worldwide sales success. In expired U.S. Pat. No. 4,813,680 there is no disclosure nor anticipation of usage of any remote signal activation of water release. Gameplay of the device of that patent involves the wearer of the device randomly selecting and then physically removing a particular rod from his own hat as the result of a gameplay directive, such as a spinner. Alternative play, where another player who is not himself wearing the hat of the invention physically removes a rod from a wearer's hat still requires physical contact and manual means to activate water release. There are no motors, batteries, processors, displays, etc.

The recently-allowed utility patent (U.S. Pat. No. 10,471,340) to which this application is a continuation in part, discloses and describes the release of a liquid onto the head of a wearer when a wireless signal is received from a remote transmitter.

A product was marketed in the past that was based upon several patents (U.S. Pat. Nos. 5,722,660 and 5,992,853 "GAME WITH TIMED WATER RELEASE") by the inventor of this application. IN YOUR FACE® is a multi-player game wherein one player stands in the center of a group of players and asks a question that must be acceptably answered, in turn, by each other player, all who are sitting in a circle. The player asking the question is holding a motorized timer and spray emitting game unit, and presses or releases a trigger to set or reset a timer. When a seated player answers unacceptably or does not answer in time, a spray is emitted from the game unit and sprays towards that player. The product did not incorporate any signal sending or receiving means to activate a remote release of water, and no element of that invention was intended to be worn by anyone. To the contrary, water release was only accomplished by an opponent pointing a device towards another player.

In 1989 Pressman Toy Corporation released a product called HYDRO-STRIKE. It was a skill and action game, without any electronics or signal sending/receiving. There are no separate units to the game. Nothing is worn by a player. It is described in this manner: "Players sit at either end of the plastic board controlling two flippers with a goal in between them. A marble is released, and players try to shoot it into their opponent's goal. When a goal is scored, a jet of water shoots out spraying the losing player. No batteries are needed—just fill the tank with water and pump up the pressure". There is no timed nor electronic activation, and water release is the mechanical response of a ball striking a trigger mechanism.

Other toys have successfully provided children with the entertainment of getting wet in a competitive play situation. Inventor cited in this application also invented CONTACT ACTIVATED PRESSURIZED WATER RELEASE TOY, U.S. Pat. No. 5,256,099. That invention resembles a handheld toy sword and requires one player to press a release valve at the front end of the toy onto the body of an opponent. There is no provision for remote signal-activated water release, nor for any interactive gameplay between players, other than physical contact.

Hasbro introduced a product in late 2016 called DUNK HAT. This toy has a water container situated atop one player's head, and two target plates, one on each side of the hat. Other players throw balls at the hat, trying to hit one of the plates, to activate the release of water onto the head of the player wearing the hat. There are no electronics, no sending of receiving of signals. This product requires that the wearer stand in position while objects are being thrown towards the target plates by other children, often with poor aim. The product provides a clear plastic eye shield panel to protect the wearer of the toy from being struck by a projectile.

Further, headsets have been tethered to laser tag guns. Some professional laser tag parks will provide a piezo speaker in a head-worn unit that can buzz to mildly irritate a player when they get "shot" by an opponent's light beam. There is no provision for water release onto the head of a player when they are struck by an opponent's light beam.

In addition, Hasbro (and before them, Milton Bradley Company) for many years has marketed an electronic console game called "SIMON" (1978) that requires players to push buttons in response to a programmed light sequence displayed by inner circuitry. Innumerable similar games requiring players to respond to a light-illumination sequence by pressing a button or in some other fashion activating a switch, have also been on the market, Atari's "TOUCH ME" (1974) game being a handheld example that admittedly inspired "SIMON" and then other games like Castle Toy's "EINSTEIN" (1979) and more recently Mattel's "LOOPZ" game (released in the 2000's) that provides a unique added feature of players passing their hands and arms through motion-sensing areas (to activate switches) in response to a timed light sequence. None of the prior art hints at or involves a water penalty, particularly a water penalty initiated by a signal from the play device to activate a release of water, from another playset component, onto the head of a player.

In 1998 a company called Toymax marketed a line of products called Laser Challenge that involved two or more players holding blaster-guns emitting infrared signals in the direction of an opponent. Each player also wore a vest that included an infrared receiver. When a signal from another player's gun was received by the receiver in a player's vest, score would be made and a sound would be emitted. One model of toy in that product line was called Cyber Splash Laser Challenge. It included a water container and a battery operated pump mechanism that sprayed water upward towards the face and chin of the player after a series of signals were received by the infrared receiver on the vest. Each player therefore held a blaster gun and wore a vest and water sprayed upward.

Laser tag play systems continue to be successful on the commercial market. An exemplary system is Hasbro's Laser Ops Pro Blasters that emit wireless signals from handheld blasters (the toy industry name for "guns") when those blasters are aimed at another player's receiver worn on a vest or on a hat or even positioned on the second player's own blaster gun. Respecting the Office's requirement for no active hyperlinks, we nonetheless are providing inactive hyperlink addresses in case the examiner would like to understand our research and technical position: https://www.popularmechanics.com/technology/gadgets/a22169885/nerf-laser-ops-pro/ None of those systems anticipate, describe or provide for any means by which a liquid might be released onto the head of a player.

VIRTUAL REALITY GAMING: Digital virtual reality gaming devices and systems, such as are sold by a company called "Oculus", provide players with goggles that present digital images onto an internal screen or screens of goggles or glasses or similar eyewear associated with the system, and those images respond to the movements of the wearer to simulate virtual reality that can include combat. These systems do not present or disclose any liquid-release penalty onto an opponent as a result of one player winning or losing a competition. https://www.oculus.com/quest/?&utm_source=gg&utm_medium=a_ps&utm_term=%2Bvirtual%20%2Breality&utm_campaign=2071432473&utm_content=368943392352&utm_parent=quest&utm_ad=77197178780&utm_location=9013171&utm_location2=&utm_placement=kwd-19673535367&utm_adposition=1t2&utm_device=c&utm_matchtype=b&utm_feed=&gclid=CNWMuZbK2OQCFcQvgQodidoIQg&gclsrc=ds Varying systems, such as VOID offers players an immersive experience that places players in a virtual world for laser tag combat play, again without any mention or disclosure of a liquid-release penalty. https://www.thevoid.com/what-is-the-void/

Virtual reality is defined as follows by Lexico/Oxford: https://www.lexico.com/en/definition/virtual_reality. "The computer-generated simulation of a three-dimensional image or environment that can be interacted with in a seemingly real or physical way by a person using special electronic equipment, such as a helmet with a screen inside or gloves fitted with sensors.

The above systems typically comprise sensors, typically in the headsets themselves, to detect and calculate movements and direction of the wearer, and can also send signals via smartphone or computer connection to other players of the system."

AUGMENTED REALITY GAMING: "VR PRO ST" is an example of an augmented reality gameset involving goggles that can present digital images to a wearer, and simultaneously provide the wearer with the ability to see through said digital images, thereby enabling the wearer to look into the actual environment in which they are playing (for example a game room, or a laser tag competition environment). This combination of digitized image and real-life image presentation is referred to as augmented reality. Franklin Institute defines Augmented Reality in this manner:

"Augmented reality (AR) is one of the biggest technology trends right now, and it's only going to get bigger as AR ready smartphones and other devices become more accessible around the world. AR let(s) us see the real-life environment right in front of us—trees swaying in the park, dogs chasing balls, kids playing soccer—with a digital augmentation overlaid on it. For example, a pterodactyl might be seen landing in the trees, the dogs could be mingling with their cartoon counterparts, and the kids could be seen kicking past an alien spacecraft on their way to score a goal. https://www.fi.edu/what-is-augmented-reality Oxford/Lexico describes augmented reality in this manner:

"A technology that superimposes a computer-generated image on a user's view of the real world, thus providing a composite view." https://www.lexico.com/en/definition/augmented_reality An exemplary system utilizing augmented reality is: https://www.vrealities.com/products/augmented-reality/vr-pro-st Oculus, acquired by Facebook, is a virtual reality gaming experience and system and is exemplary of virtual reality gaming systems, and provides for downloadable software to a smartphone such as, for example, an iPhone or Android phone, and then provides for wireless synchronization to said phone via wireless internet access, for example 802.11 b/g/n, at which time the oculus goggles can receive data and images from the phone wirelessly, to affect the presentation of images onto the screen in front of the eyes of the wearer. https://www.oculus.com/?locale=en_US The above-described technology to provide downloadable software to a smartphone, or other computer-like device is applicable to both augmented as well as virtual reality gaming systems and is well-known by those familiar with the art of such technology.

Wikipedia defines Mixed reality in this manner: "Mixed reality is the merging of real and virtual worlds to produce new environments and visualizations, where physical and digital objects co-exist and interact in real time. Mixed reality does not exclusively take place in either the physical or virtual world, but is a hybrid of reality and virtual reality, encompassing both augmented reality and augmented virtuality via immersive technology."

For purposes of this patent application, the term "computer" is intended to be understood in its broad definition, and not limited to a laptop or desktop unit requiring a keyboard and monitor. For example, the technology of a smartphone or tablet, or of a printed circuit-board as described herein certain embodiments as being resident in the componentry of the headgear, qualifies as "computer": https://www.google.com/search?client=firefox-b-1-d&q=computer+definition "an electronic device for storing and processing data, typically in binary form, according to instructions given to it in a variable program."

Purpose of this Invention and Market Viability

The technologies of image projection and display, and the communication capabilities for players of coordinated equipment to interact both with one another as well as with a system-generated gaming play environment, is well-established and well-known, and commercially successful technology. Those knowledgeable in the art of digital gaming are familiar with the well-developed technologies that provide for digital imaging and competition between players wearing devices of such systems, and provide for different players to be accessing and participating in a gaming experience across platforms including but not limited to smartphones, consoles both wired and wireless, computers, etc.

The internet has further enhanced the play capabilities and provided for remote and offsite competitions between players, even in different countries. Many of the above-mentioned systems can be accessed and played over social media apps such as FACEBOOK. https://medium.com/@tickarawr/vr-social-networks-will-be-all-the-rage-in-2018-fda5093c65

"FORTNITE" is a highly successful worldwide digital gaming experience that is available to play "cross platform" meaning that one player can access and play the game program from a desktop computer, while another player might participate in the same gaming experience from a third party gaming console, such as a Nintendo Xbox. https://www.nbcnews.com/tech/tech-news/what-fortnite-look-video-game-has-become-phenomenon-n887706

Cross-platform digital gaming participation and experience would also function well with the technology of this invention. Such systems might include, for example, varying operating systems and varying physical equipment and game consoles, such as iOS and Google, Nintendo and Sony Play Station and Xbox.

Fortnite exemplifies the technical compatibility of a digital gaming experience that can provide interaction between players not only in different rooms or cities, but potentially on different continents. The resultant competitive actions and reactions of one player can signal and activate responses to another player any place on earth. The technology is well-known and well proven.

Illustrated examples of oculars-based, glasses or goggle-worn play are provided in this application to illustrate what might appear on the screen of a player's electronic display, looking from inside his goggles. There could even be provided a second small screen that shows a live image or recent still image of an opponent (who is in front of a camera, perhaps a camera on a computer or smartphone coupled to that player's headgear). When a particular player's game unit is signal-activated to release a liquid such as water on him, his opponent(s) can witness the event.

Commercial Viability and Advantage

The emergence of social media experiences such as Youtube, Facebook, and similar (Twitter, Instagram, etc.) platforms, confirm the viability and financial potential of users "liking" or sharing, en masse and to broad follower-audiences, posted experiences so that others can view and enjoy. It has already been experientially determined that in order for posted play experiences to gain greatest popularity, a highly visual activity is most desired, if not even required. Blinking lights or beeps at the conclusion of a gaming activity has not proven to be an exciting visual climax. Therefore, the commercial great success of laser tag and even Fortnite and Fortnite-like gaming do not perfectly lend themselves to social media posting because, although the PLAY experience is excellent and exciting, there is a lack of visual "pay-off" when a player WINS or LOSES a competition—resulting in a less-than-exciting visual CLIMAX. The technology of the invention described herein this application provides a highly visual and social-media post-able conclusion to winning or losing.

The release of a fluid onto the head of a player of game has been proven by an invention of the inventor cited in this application, who is co-inventor of a simple non-electronic game called "WETHEAD" as described earlier in the Prior Art. WETHEAD mechanically emits water as the result of one of eight plastic rods being manually removed to release stored water onto a wearer's head. In recent years, YouTube postings of WETHEAD play events garnered more than 350,000,000 views, confirming the notable success of the climax-event of water delivery onto the head of a game player.

It is an intent and purpose of the invention in this application to disclose the function of electronic-signal liquid (preferably water) release onto the head of a game-player participating in an electronic gaming activity wherein digital images are presented to one or more players and wherein a remote signal is transmitted or received either from a competitor-opponent(s), or such signal is received from a system-gaming application, for example from a game program being played on a Nintendo game console, wherein a player or players wearing the water-containing headgear may either fail to complete a game task in which case he or they would get wet, or else has succeeded in completing a game task, at which time an opponent's headgear would receive an electronic signal and said opponent would then get wet as a result of a liquid such as water being released from his own head-worn headgear. It is understood that, and has even been exemplified by third-party-posted videos, that instead of water, juices, milk, and even more viscous fluids such as one commonly referred to as "Slime®" can be released onto the head of a player.

It is the contention of the inventor of this invention that the addition of the already-proven commercial success and social media success of liquid-release play penalty, coupled to the already-proven success of online multi-player or player-versus-game-system competition, offers players the ability and motivation and enjoyment of being able to post and watch and comment on gaming of this sort, and provides gaming manufacturers employing this feature with an already proven-enjoyable, unique and marketable play feature. Currently none of the digital gaming systems—solo, player to player, augmented or virtual reality, provide for or suggest a penalty of liquid release onto the head of either the wearer of the headgear, or onto the head of an opponent(s) wearing similar headgear.

Players can be competing via an internet connection. A player's headgear could range from a special pair of wireless goggles to a hat wired to the keyboard or the computer. Electronic signals to headgear, activating water release, can arrive by wire, or wirelessly via Wi-Fi, Bluetooth, etc. A player's helmet or goggles or other embodiment of "headgear" of the disclosed invention might be signaled to release liquid, preferably water onto the wearer's head after one of several events may have occurred:

1. Another player has completed a task or aimed accurately at either something such as a target area presented on an electronic display, or aimed accurately at a video image of another player participating in the gaming activity, OR
2. The wearer of headgear of the invention has failed a task or missed aiming at something or someone; OR
3. A programmed "villain" or similar opponent in a gaming app or program has succeeded in doing something that would cause another player to get wet, for example trapping a digital figure representing a player of the game (an "avatar" image selected by that player) in a room.

OBJECTIVES OF THE INVENTION

It is an objective of this invention to provide a gaming system or toy that sprays or pours water or similar fluid spraying onto the head of a player when a gaming activation event occurs. It is further an objective of this invention to provide a competitive play pattern wherein a player or players' actions can cause the release of liquid (preferably but not limited to water) spraying or pouring down onto the head of at least one player by means of a remote signal activation being transmitted from a second component of the invention, whether the player activating the liquid release is the wearer of the head-worn unit, or a competitor wearing a similar head-worn unit and receiving a remote signal that activates liquid release from his headgear. The aforementioned objectives are exemplary and not intended to limit the scope of the invention.

In one embodiment of the invention, bi-directional communication takes place between headgear and console units, gaming controllers or other physical components. For example, it could be established that one headgear unit communicated to another headgear unit so that the second headgear responded uniquely to a signal from the first headgear. To achieve such bi-directional communications receivers and transmitters of the invention, as described herein, could be replaced by transceivers. Optionally, the headgear further comprises at least one dispenser configured to dispense the liquid from the liquid reservoir onto the player's head when the receiver receives the wireless signal from the transmitter. Optionally, the at least one liquid dispenser comprises at least one tube comprising a proximal end connected to the liquid reservoir and a distal end and further wherein the at least one tube is configured to transport the liquid from the liquid reservoir so that the liquid may be dispensed onto the player's head. Optionally, the at least one dispenser comprises at least one tube and at least one spray nozzle and further wherein the at least one tube comprises a proximal end connected to the liquid reservoir and a distal end connected to the at least one spray nozzle and further wherein the at least one tube is configured to transport the liquid from the liquid reservoir to the at least one spray nozzle so that the at least one spray nozzle may dispense the liquid onto the player's head.

The present disclosure further provides a method of play comprising the steps of: a) providing the gameset; b) placing the headgear on a player's head; c) transmitting a wireless signal from a remote transmitter to the receiver; and d) dispensing liquid from the liquid reservoir onto the player's head in response to the receiver receiving the wireless signal from the transmitter. Optionally, the method further comprises at least one player playing a gameplay sequence before step c). Optionally, said transmitter is located on a handheld remote device further comprising at least one switch and the method further comprises at least one player directly or indirectly manipulating the at least one switch before step c).

In other words, the transmitter may be located on a handheld remote device further comprising circuitry and a button and the method may further comprise at least one player depressing or failing to depress a button, causing the circuitry to generate and emit the wireless signal.
Optionally, the remote device is a mobile phone and the at least one switch is an electronic switch activated by at least one player playing a game app on the mobile phone and depressing, for example, a certain location on the graphical user interface of the mobile phone. Optionally, the transmitter is located on a remote device that further comprises at least one switch and the method further comprises at least one player directly or indirectly manipulating the at least one switch in accord with a programmed gaming sequence before step c). Optionally, the transmitter is located on an electronic tabletop game console that further comprises at least one switch and method further comprises directly or indirectly manipulating the at least one switch, prior to step c) to identify the position of the headgear relative to the electronic tabletop game console. Optionally the receiver in the headgear is a mobile phone that can either sense x,y,z axis movements of the wearer, and/or respond to a received signal and present a virtual reality image to the wearer and also activate the release of liquid onto the wearer's head when a gaming sequence appropriately activated such water penalty release, for example when the wearer was "shot" by a wireless signal either sent from an opponent's blaster gun, or the wearer failed a gaming competition requirement, such as moving his head appropriately to avoid a virtual either failed to move his body appropriately to avoid a virtually presented obstacle image, and a signal was thus activated by his own gaming failure, sensed by the smartphone's motion sensors. Motion sensors could be attached to a body of a player, and said sensors could communicate, wired or wirelessly, to the headgear of the player, to detect and transmit physical body movement that can impact game outcome.

The present disclosure further provides a method of play of a game activity comprising the steps of: a) positioning at least one player near an electronic tabletop game console that comprises a liquid reservoir configured to hold a liquid, a dispenser configured to spray the liquid from the liquid reservoir onto the player, and at least one switch; b) activating the electronic tabletop game console; c) directly or indirectly manipulating the at least one switch in accord with a programmed gaming sequence; and d) the electronic tabletop game console spraying liquid from the liquid reservoir towards the at least one player in response to the manipulation of the at least one switch. Again, the electronic tabletop game console may include circuitry and the at least one player may manipulate components within the circuitry before step c) by, for example, depressing or failing to depress a button.

In some embodiments, the present disclosure provides a gameset comprising headgear such as goggles that is worn by at least one player. In certain embodiments, multiple players could each wear one of said headgear. The headgear may each contain liquid, preferably water stored in a reservoir or similar container, and headgear may each contain electronics to receive a signal from a remote transmitter/sender unit. Transmitter/sender units could either be inside handheld blaster guns held by opponents, or could be situated inside a gaming console that could be played on a tabletop. In the exemplary embodiment involving a handheld blaster gun, when an opponent pulled a trigger and then successfully sent a signal or signals to an opponent's headgear receiver, water or another liquid may be released onto the head of the headgear wearer. In the embodiment involving a gaming console, when a signal is transmitted from said console as a result of some action or inaction by a player or players, a wireless signal from said game console may activate water release onto the head of a player wearing a headgear.

Headgear may provide for the direct coupling of a smartphone to the electro-mechanical components in the headgear, or headgear might include wireless communication capabilities so that the headgear receives a remote signal from a nearby smartphone or tablet.

More particularly, in some embodiments, the present disclosure provides a gameset configured to emit a liquid onto a player comprising: headgear configured to be worn on a head of a player and comprising a receiver and a liquid reservoir configured to hold a liquid; and a remote device comprising a transmitter configured to transmit a wireless (dispensing) signal to the receiver; and at least one power source configured to power the transmitter and the receiver, wherein, upon reception of the wireless signal from the transmitter, the receiver is configured to cause the headgear to dispense the liquid from the liquid reservoir and onto the player's head. In other words, the wireless signal may be a signal that communicates to the headgear to dispense the liquid onto the player's head. The "remote" device may be physically near the headgear (e.g., the remote device may be located only a few feet in front of the headgear). Preferably the remote device is not physically attached to the headgear.

SUMMARY OF THE INVENTION

This is a continuation-in-part application pertaining to an allowed application wherein is described a system whereby a head-worn invention contains a water or other liquid container and then releases the water or other liquid onto the head of a wearer of the invention when a valve is opened.

An intent and purpose of this application is to disclose the invention of liquid release of a fluid or fluids, preferably water, onto the head or heads of a player or players of an interactive game, as an entertaining and visual "penalty" when either that player fails to perform a task or competition required by the gameplay, or another player succeeds at same, or a preprogrammed event within the game is either concluded or is failed to be concluded by either that first player or an opponent of said first player. Furthermore, a liquid release penalty is a strong visual event purposed to entertain third party viewers to the gaming experience. In some embodiments, the present disclosure provides a gameset comprising headgear such as a playhat (also referred to herein as a helmet) that is worn by at least one player. In certain embodiments, multiple players could each wear one of said playhats. The playhat(s) may each contain liquid, preferably water stored in a container, and may each contain electronics to receive a signal from a remote transmitter/sender unit. Transmitter/sender units could either be inside handheld blaster guns held by opponents, or could be situated inside a gaming console that could be played on a tabletop. In the embodiment involving a handheld blaster gun, when an opponent pulled a trigger and then successfully sent a signal or signals to an opponent's playhat receiver, water or another liquid may be released onto the head of the playhat wearer. In the embodiment involving a gaming console, when a signal is transmitted from said console as a result of some action by a player or players, a wireless signal from said game console may activate water release onto the head of a player wearing a playhat.

More particularly, in some embodiments, the present disclosure provides a gameset configured to emit a liquid onto a player comprising: headgear configured to be worn on a head of a player and comprising a receiver and a liquid reservoir configured to hold a liquid; and a remote device comprising a transmitter configured to transmit a wireless (dispensing) signal to the receiver; and
at least one power source configured to power the transmitter and the receiver, wherein, upon reception of the wireless signal from the transmitter, the receiver is configured to cause the headgear to dispense the liquid from the liquid reservoir and onto the player's head. In other words, the wireless signal may be a signal that communicates to with the headgear to dispense the liquid onto the player's head. The "remote" device may be physically near the headgear (e.g., the remote device may be located a few feet in front of the headgear) but the remote device is preferably not attached to the headgear.

Optionally, the headgear comprises a hat and the receiver. Optionally, the headgear comprises a helmet comprising a chin strap configured to strap the helmet to a chin of the player. Optionally, the remote device is a toy gun comprising a handle and a trigger connected to the handle, and depressing the trigger is configured to transmit the wireless signal. Optionally, the wireless signal is an infrared signal. Optionally, the remote device is a console that further comprises at least one button configured to activate an electronic switch. Optionally, the remote device is a mobile phone. Optionally, the headgear is further configured to emit lights, sounds or combinations thereof in response to the receiver receiving the wireless signal. Optionally, the receiver and transmitter are transceivers capable of bi-directional communication. For example, in an embodiment of the invention, bi-directional communication takes place between playhats and consoles or other physical components. For example, it could be desired that one playhat communicated to another playhat so that the second playhat responded uniquely to a signal from the first playhat. To achieve such bi-directional communications receivers and transmitters of the invention, as described herein, could be replaced by transceivers. Optionally, the liquid is water. Optionally, the headgear further comprises at least one dispenser configured to dispense the liquid from the liquid reservoir onto the player's head when the receiver receives the wireless signal from the transmitter. Optionally, the at least one dispenser comprises at least one tube comprising a proximal end connected to the liquid reservoir and a distal end and further wherein the at least one tube is configured to transport the liquid from the liquid reservoir so that the liquid may be dispensed onto the player's head. Optionally, the at least one dispenser comprises at least one tube and at least one spray nozzle and further wherein the at least one tube comprises a proximal end connected to the liquid reservoir and a distal end connected to the at least one spray nozzle and further wherein the at least one tube is configured to transport the liquid from the liquid reservoir to the at least one spray nozzle so that the at least one spray nozzle may dispense the liquid onto the player's head.

The present disclosure further provides a method of play comprising the steps of: a) providing the gameset; b) placing the headgear on a player's head; c) transmitting a wireless signal from the transmitter to the receiver; and d) dispensing liquid from the liquid reservoir onto the player's head in response to the receiver receiving the wireless signal from the transmitter. Optionally, the method further comprises at least one player playing a gameplay sequence before step c). Optionally, said transmitter is located on a handheld remote device further comprising at least one switch and the method further comprises at least one player directly or indirectly manipulating the at least one switch before step c). In other words, the transmitter may be located on a handheld remote device further comprising circuitry and a button and the method may further comprise at least one player depressing or failing to depress a button, causing the circuitry to generate and emit the wireless signal.

Optionally, the remote device is a mobile phone and the at least one switch is an electronic switch activated by at least one player playing a game app on the mobile phone and depressing, for example, a certain location on the graphical user interface of the mobile phone. Optionally, the transmitter is located on a remote device that further comprises at least one switch and the method further comprises at least one player directly or indirectly manipulating the at least one switch in accord with a programmed gaming sequence before step c). Optionally, the transmitter is located on an electronic tabletop game console that further comprises at least one switch and method further comprises directly or indirectly manipulating the at least one switch, prior to step c) to identify the position of the headgear relative to the electronic tabletop game console.

The present disclosure further provides a method of play of a game activity comprising the steps of: a) positioning at least one player near an electronic tabletop game console that comprises a liquid reservoir configured to hold a liquid, a dispenser configured to spray the liquid from the liquid reservoir onto the player, and at least one switch; b) activating the electronic tabletop game console; c) directly or indirectly manipulating the at least one switch in accord with a programmed gaming sequence; and d) the electronic tabletop game console spraying liquid from the liquid reservoir towards the at least one player in response to the manipulation of the at least one switch. Again, the electronic tabletop game console may include circuitry and the at least one player may manipulate components within the circuitry before step c) by, for example, depressing or failing to depress a button.

DETAILED DESCRIPTION OF THE DRAWINGS

With reference to FIGS. 1-11, the present disclosure generally provides a game for delivering water or other liquid onto a player's head. In some embodiments, the present disclosure provides a system that includes at least two components: 1) a transmitter unit, which may be in the form of a toy blaster gun or electronic tabletop game console for example, comprising a transmitter that transmits a wireless signal to a receiver unit; and 2) the receiver unit, which may be in the form of headgear, such as a playhat, worn by a second player for example, and includes a receiver for receiving the wireless signal. Then in response, water or another liquid is dispensed from a liquid container located on the headgear onto the second player's head. The toy blaster gun may include a handle and trigger for example. In other embodiments, the electronic tabletop game console itself directly sprays water or other liquid onto the player. These and additional embodiments are described below, together with additional optional features.

Figure 1:
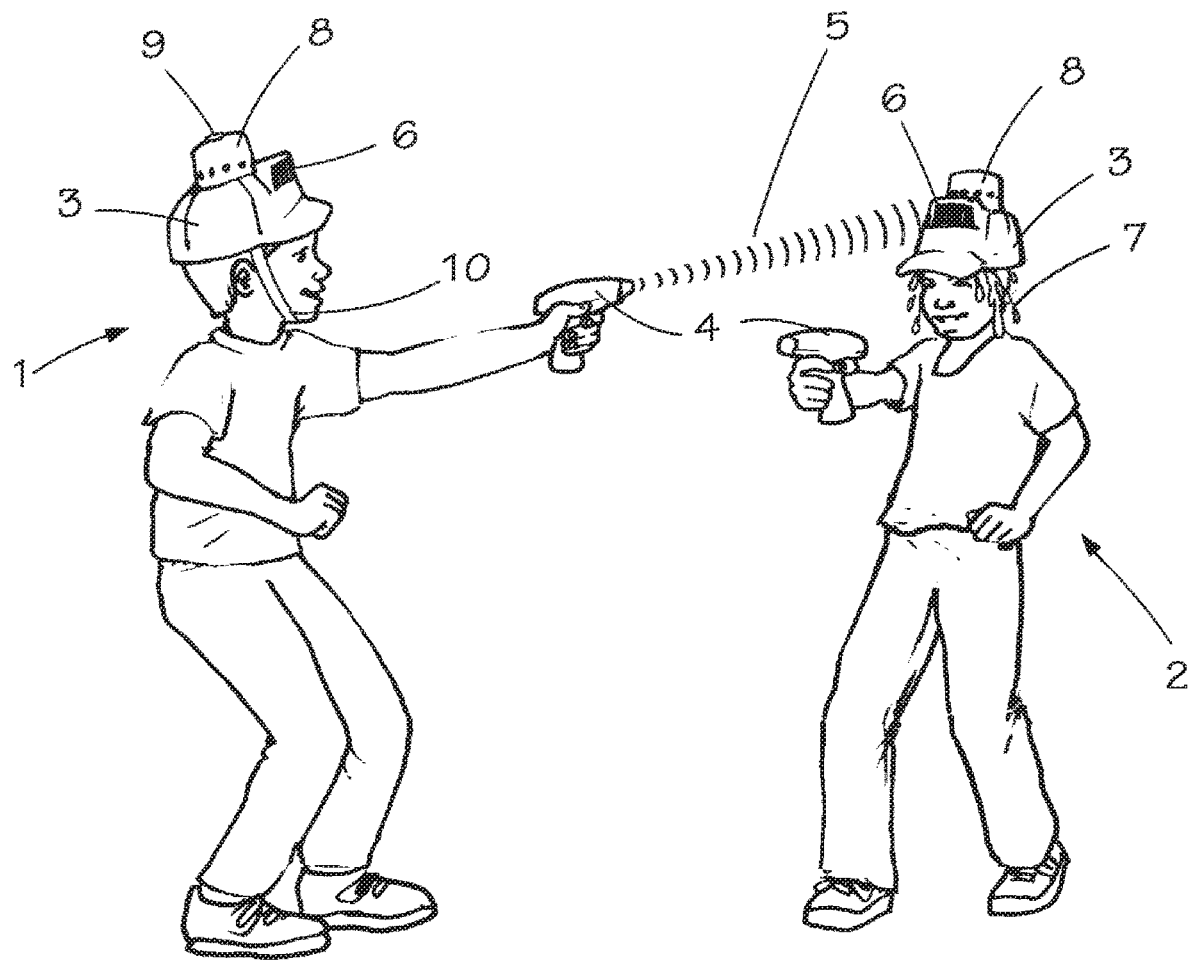
FIG. 1 illustrates a side perspective view of two players playing a gameset of one embodiment of the present invention, as a combative game competition with handheld blaster guns.

Referring now to FIG. 1, players 1 and 2 are depicted each holding a toy blaster gun 4 that includes a transmitter 100 for transmitting a wireless signal(s) such as an infrared signal, when a trigger 15 is depressed. Radiating lines 5 represent the infrared signal as it is traveling to electronic signal receiver 6 coupled to the headgear, namely, a playhat 3 that each player 1 and 2 is wearing. Preferably, playhats 3 are in the form of a helmet as illustrated in FIG. 1. Said playhats 3 each contain a liquid container 8 that can release liquid preferably water 7 onto the head of a player wearing the playhat 3. Though not shown in a drawing, it is understood by someone skilled in the art of gaming and toy invention that a haptic "penalty" such as the activation of mild electric shock by a low-voltage power source of the invention, or a small motor such as a Mabuchi toy motor with an off-center weight affixed to its shaft to generate a vibration and powered by the power source of the invention can provide an exciting haptic penalty in place of or in conjunction with the release of water onto a player's head. Current and prior-marketed toys such as ballpoint pens that shock a holder as a gag, or Hasbro's "Perfection" game that vibrates wildly to startle a player, are examples of haptic penalties. Playhats 3 can each have a liquid (preferably water) fill location hole that can be sealed by a removable or pivotable cap 9. The players 1 and 2 would stand at a distance from one another and partake in an action sport competition commonly referred to as "laser tag" where each player is attempting to score points by transmitting a signal to a remote receiver on an opponent's body-worn equipment, preferably their head. In the unique invention of this application, instead of simply sounds and scoring being activated, water is released onto the head of a player who is wearing a water-containing playhat 3 that responds to a wireless signal 5 transmitted by a transmitter 100 of a toy blaster gun 4 of another player. A playhat 3 could be held securely in place on a player's 1 and 2 head by a retainer strap 10. Other wireless signal technology could be employed instead of infrared, such as radio frequency signals or Near Field technology or light beams. Infrared is a preferred embodiment for this invention since the infrared beam is very easily directed in a particular direction (for example, by a molded shield or mask that would require the beam-transmission to be accurately directed by the player holding the blaster gun 4), thus reinforcing the play pattern of one player (for example, player 1) aiming their blaster gun 4 at player 2, while player 2 is attempting to avoid his or her receiver 6 from receiving the wireless signal 5. Directional control of the wireless signal is further detailed in the description of FIG. 2, below. Toy blaster gun further includes handle 101.

Figure 2:
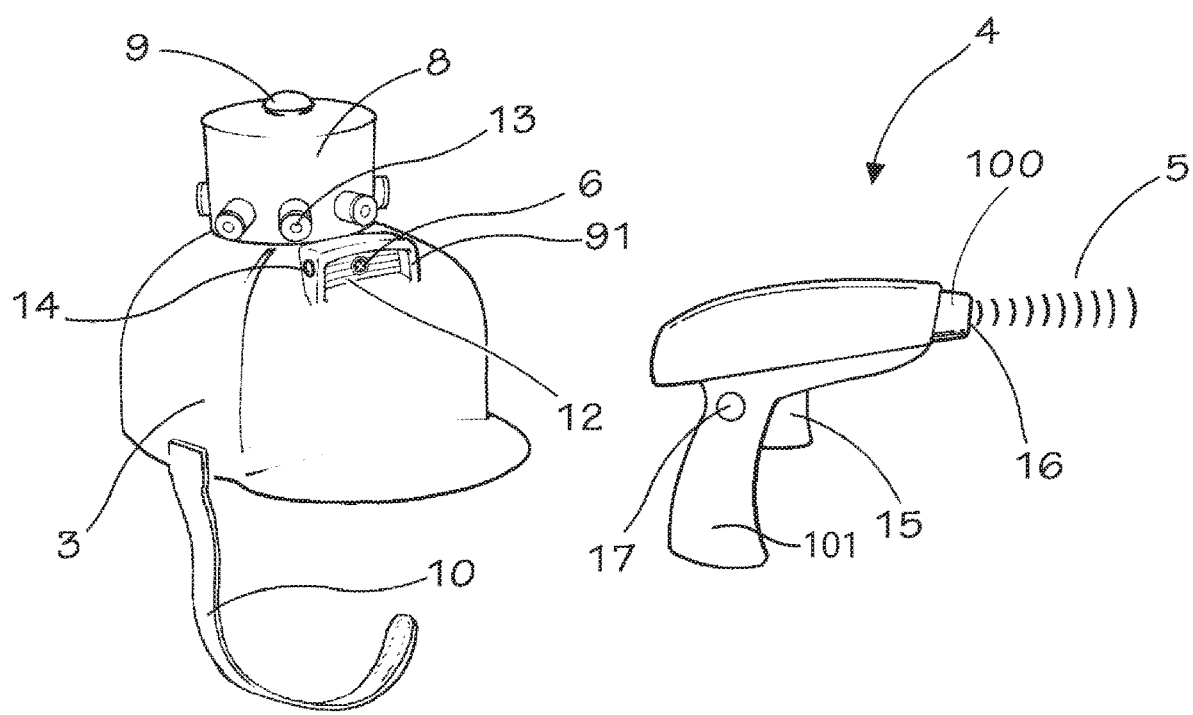
FIG. 2 illustrates side views of the playhat and blaster gun of the gameset of FIG. 1.
Figure 2A:
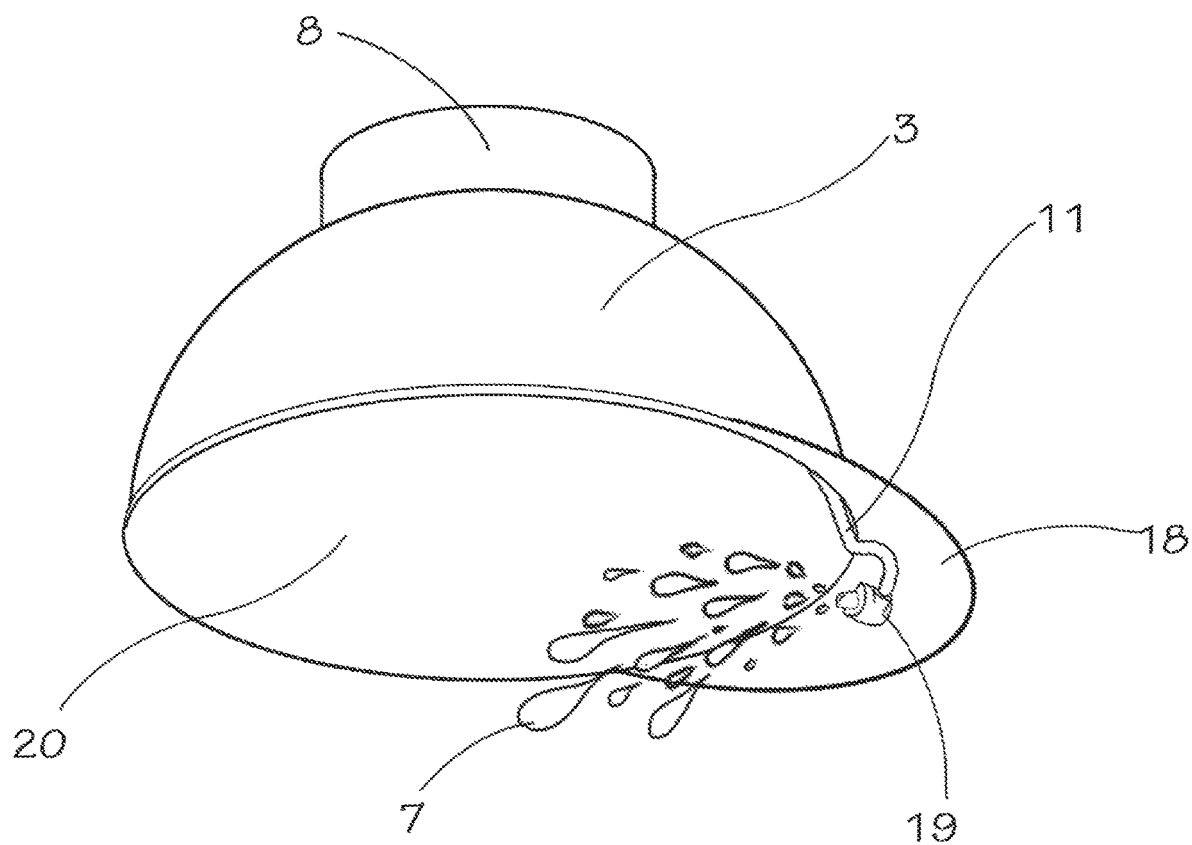
FIG. 2A, illustrates a bottom perspective view of the playhat of FIG. 2.

FIG. 2 illustrates the parts of the embodiment shown in FIG. 1. Playhat 3 can be manufactured of high impact styrene or similar moldable plastic material such as ABS or polyethylene or polypropylene. Retainer strap 10 could be vinyl or similar flexible material. Alternatively, an internal adjustable headband, not shown, could be positioned in the playhat 3 interior. Coupled to the playhat 3 is an electronic signal receiver 6 positioned in a visually unique "target area" 12 of said playhat 3, so that another player can see where to aim their toy blaster gun 4 during a play round. Sidewalls 91 at the target area of playhat 3 provide a certain measure of "aim-requirement" for wireless beam direction to provide for gaming challenge, requiring opponents to aim their blaster gun 4 accurately. Furthermore, the shape of the LED transmitter lens of the blaster gun 4 can be so shaped as to affect the beam shape as it exits the blaster gun 4. Infrared technology, the preferred wireless signal embodiment for the handheld blaster gun gameplay, can be specified as being infrared laser, or narrow-beam or wide-beam infrared (all commonly known to those skilled in the art) to further enhance gameplay aiming to activate water release. Playhat 3 includes a switch 14 (e.g., an on/off switch) to activate the internal electronics shown in FIG. 6. Players 1 and 2 fill the liquid container 8 on each playhat 3 with water by pouring water into a hole underneath the removable cap 9. Players 1 and 2 activate the electronics in their playhat 3 by pressing the ON switch 14. Sounds could be emitted to signal that the playhat 3 circuitry was ready for play. LED lights 13 could illuminate and then stay lit or else blink during play rounds, or when a playhat 3 received a wireless signal 5 from an opponent's blaster gun 4. Each blaster gun 4 could be molded from injection molded high impact styrene plastic, or equivalent material commonly used to manufacture toys, such as ABS. Blaster guns 4 are depicted with a movable trigger 15 that when depressed activated the blaster gun transmitter 100 to transmit a wireless signal beam 5 from the front tip 16 of said blaster gun 4. Blaster gun electronic circuitry 40, illustrated in greater detail in FIG. 7, is activated by a player pressing a blaster gun ON switch 17. FIG. 2A shows a bottom perspective view of the playhat 3. Water container 8 is situated on top of the playhat 3. A water tube 11 has a proximal end connected to the water container 8 and a distal end connected to at least one spray nozzle 19 which in this embodiment is coupled to the underside of the hat brim 18 and therefore pointed towards the forehead of the players 1 and 2 wearing the playhats 3. It is understood there can be more than just one spray nozzle 19, and that said spray nozzle(s) 19 could be positioned any place inside the hat cavity 20, which also includes the player's head when the playhat 3 is worn. Alternatively, instead of a spray nozzle 19 (more clearly illustrated in FIG. 9), the delivery of released water 7 could be accomplished by the opening of a mechanical valve assembly 21 (FIG. 9A) to simply allow the water 7 to flow down from the water container 8 onto the head of the player 1 wearing the playhat 3, eliminating the requirement for any motorized pumping action. In an embodiment, water is not pumped from the liquid container 8 by a motorized pump but instead falls by gravity for example, though the mechanical valve assembly 21 may be powered. Preferably, however, a pump 47 is utilized to pump water from the liquid container 8.

Figure 3:
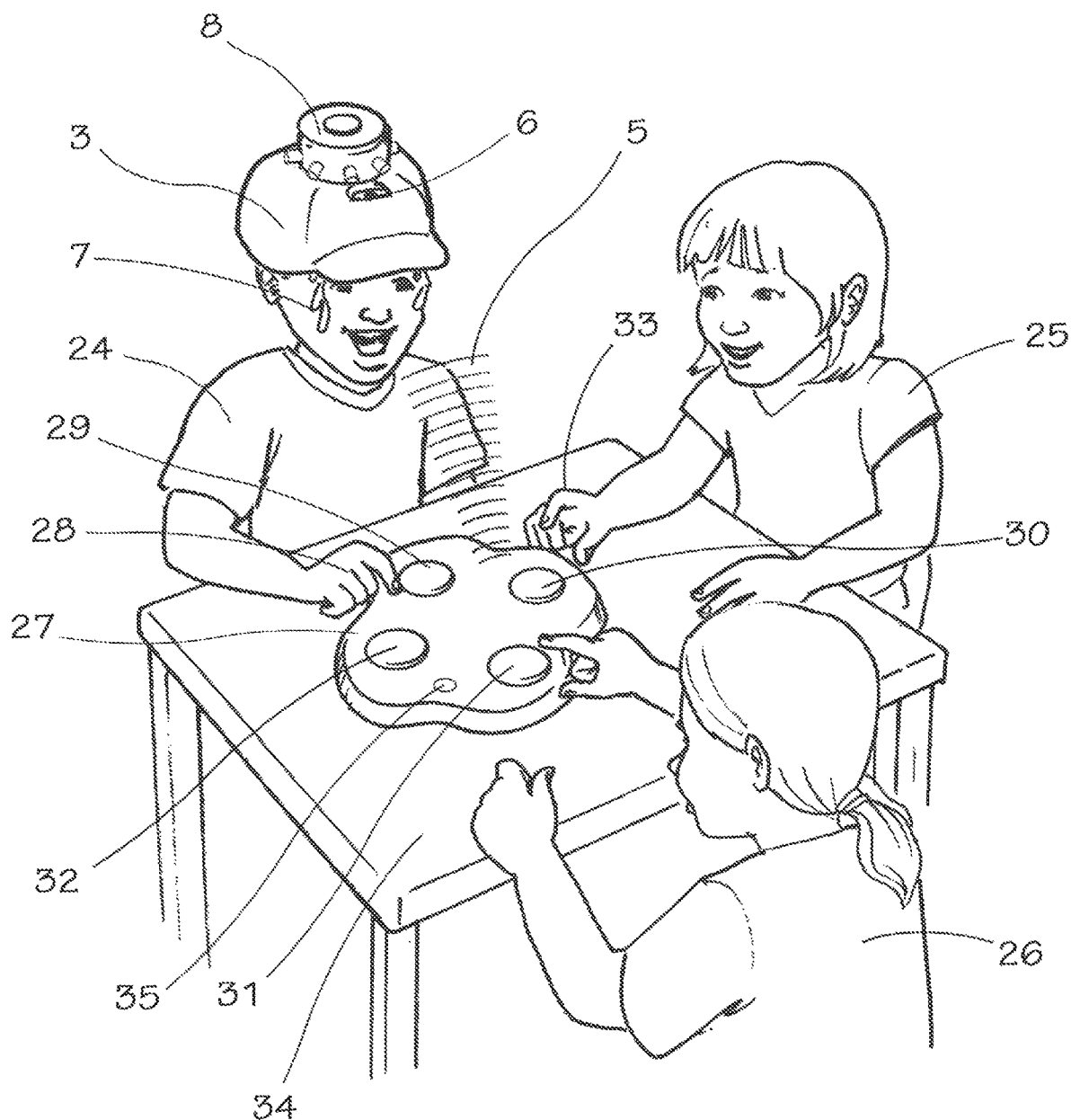
FIG. 3 illustrates a top perspective view of three players playing an electronic tabletop gaming console of one embodiment of the present invention, with one player wearing a playhat.

FIG. 3 illustrates an alternative gaming activity for the invention, in which the playhat 3 is worn by only one player 24, 25 or 26 of the game. All players, as illustrated by three players 24, 25, and 26, are seated at a game table 34. Players' hands 28 and 33 are depicted as being positioned above their respective play buttons 29, 30, 31, and 32. Electronic tabletop game console 27 is positioned on game table 34. (Electronic tabletop game console 27 is described in greater detail in FIG. 11). Play buttons 29, 30, 31, and 32 are situated atop the electronic tabletop game console 27. Players 24, 25, and 26 play a game as programmed into said electronic tabletop game console 27, and can, for example, be required to press a play button or buttons 29, 30, 31, and 32 in response to game rules and programming in the electronic circuitry of said console 27. When a specific play pattern is achieved (for example the wearer 24 of the playhat 3 failing to complete a light sequence by failing to press his play button 29 at the proper time) a wireless signal 5 can be emitted from the game console 27 to be received by the electronic signal receiver 6 in the playhat 3, activating the release of water 7 onto the head of the seated player 24. Exemplary gameplay could be as follows, it being understood that some of the order of events might vary:

A. The electronic tabletop game console 27 is activated by system button 35;

B. The water container 8 of playhat 3 is filled with water;

C. The playhat 3 is turned on via a switch 14, at which time LED's 13 can illuminate;

D. Players 24, 25, and 26 are seated at a table 34 and can press their respective buttons 24, 25, and 26, one at a time, to inform the circuitry 61 (see FIG. 8) how many players are playing, and also inform the circuitry 61 which player 24, 25, or 26 is wearing the playhat 3 (since the penalty of water release is contingent upon who is wearing the playhat 3 when a round is terminated). Informing the electronic tabletop game console circuitry 61 as to which player 24, 25, or 26 is wearing the playhat 3, can for example be accomplished in this manner: players can be instructed that the one player wearing the playhat 3 must press their electronic tabletop console game button 29 first;

E. Players 24, 25, and 26 select a particular gameplay (perhaps by pressing system button 35 several times) and then proceed to play the selected game by one or each player pressing play buttons 29, 30, and 31, respectively, on the electronic tabletop game console 27 in response to specific game rules (such as repeat a light sequence, or repeat a light sequence and add one);

F. A play event is completed (for example all players successfully complete a play button pressing sequence; OR the player 24 wearing the playhat 3 failing to press his play button 29 in time);

G. A wireless signal 5 is transmitted to a compatible wireless receiver 6 located on the playhat 3;

H. Water 7 is released onto the head of the player 24 wearing the playhat 3;

I. The play round concludes and the playhat 3 is passed to another player 25 or 26 at the table 34, for example to the player 25 to the left of the player 24 that just got wet.

Alternatively, a similar gameplay scenario can be played by all players and in the event one player who is not wearing the playhat 3 interrupts a button pressing sequence by failing to press their play button 29, 30 or 31 in time; then their respective console light (for example a light on button 31 for player 26) would blink, the round would end, and the player who had been wearing the playhat 3 for the just-concluded play round would remove the playhat 3 from their head and pass it to player 26, who would then put on the playhat 3 and wear it for the next play round. It can be understood that the electronic tabletop game console 27 as disclosed herein this application could be replaced by a mobile phone (i.e., a smartphone or tablet) that provides a game app and then emits a wireless signal 5 compatible and communicable with the receiver 6 in the head-worn playhat 3. The word "mobile phone" as used herein includes smart phones and tablets. For example, a playhat 3 as earlier described could be wirelessly connected to a Wi-Fi signal and then a game app, played on one or more smartphones, could coordinate to send Wi-Fi signals to a playhat 3 or playhats 3 to activate the release or spray of water 7 on a player or players 24, 25 or 26. Two or more players could compete on the same tablet or smartphone, or on separate tablets or smartphones. The first player to complete a gaming challenge sequence could transmit a wireless signal 5 that would then activate the release of water 7 onto the head of their opponent. In a more costly embodiment, a playhat 3 of the invention could be equipped to directly receive a wireless signal 5 from a smartphone or tablet, either from a smartphone or tablet already equipped to transmit infrared or radio frequency or Bluetooth signals, or via a connectable dongle device attached to said smartphone or tablet that then transmitted the necessary signal compatible to the signal convention of the playhat receiver 6. Such technology is typically understood by those skilled in the art of toy gaming electronics.

Figure 4:
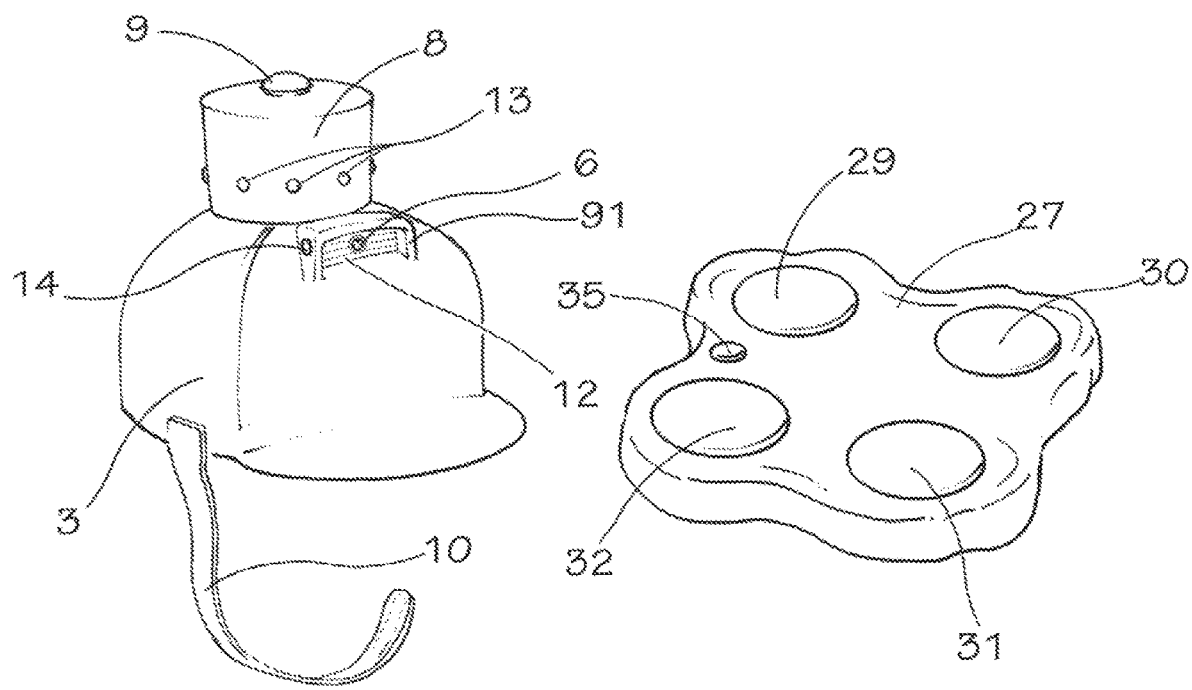
FIG. 4 illustrates side perspective views of the playhat and electronic tabletop gaming console of FIG. 3.
Figure 4A:
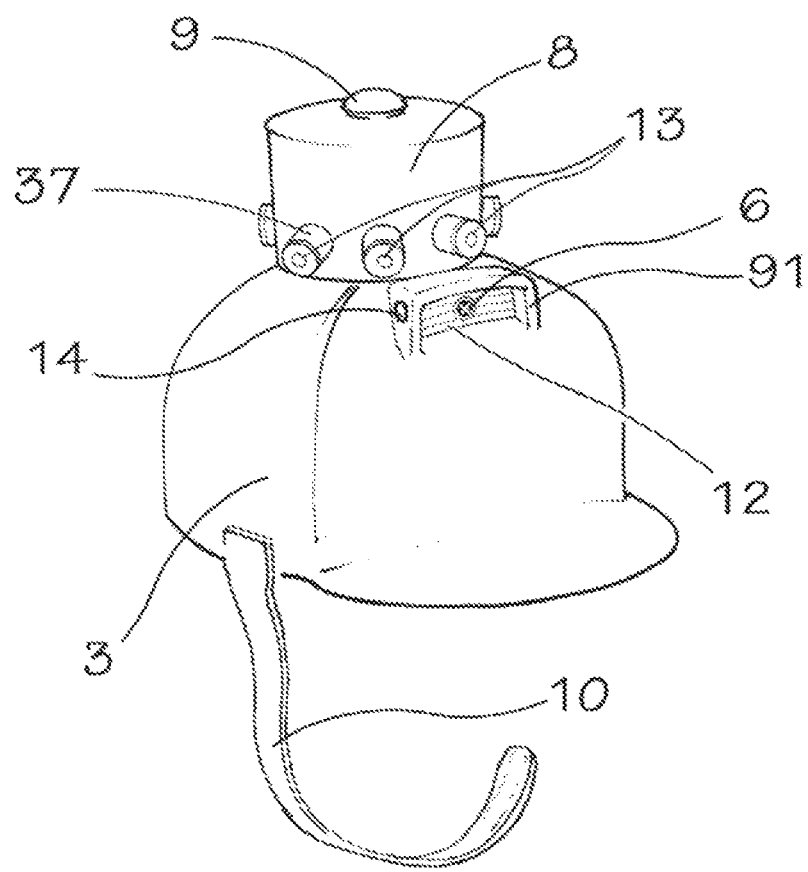
FIG. 4A illustrates a side perspective view of the playhat of FIG. 4.

FIG. 4 shows the playhat 3 and electronic tabletop game console 27 in greater detail. Elements of the playhat 3 and electronic tabletop game console 27 are as earlier described. A system button 35 on electronic tabletop game console 27 can be depressed to turn the electronic tabletop game console 27 to an "ON" state or to reset the electronics within the electronic tabletop game console 27 for a new game session, or to select one of several pre-programmed gameplays. Button 14 activates the circuitry 40 inside the playhat 3. Electronic signal receiver 6 is visible in an area of the playhat 3 that can be molded for targeting by a gaming opponent. LED's 13 can be located on the playhat 3, preferably at the lower region of the water container 8. Said LED's 13 can illuminate and blink or flash to signal an ON state and also to signal when a water release event occurs. FIG. 4A illustrates the LED's 13 being located at the tips of molded plastic rods 37, to simulate the iconic design of the classic toy "WETHEAD", the invention described herein is intended to be a technical advancement and improvement over said classic and successful toy. Rods 37 need not be removable for any reason and could in fact be molded integral to said water container 8. It is obvious that the shape of water container 8 can vary and need not be a cylinder.

Figure 5:
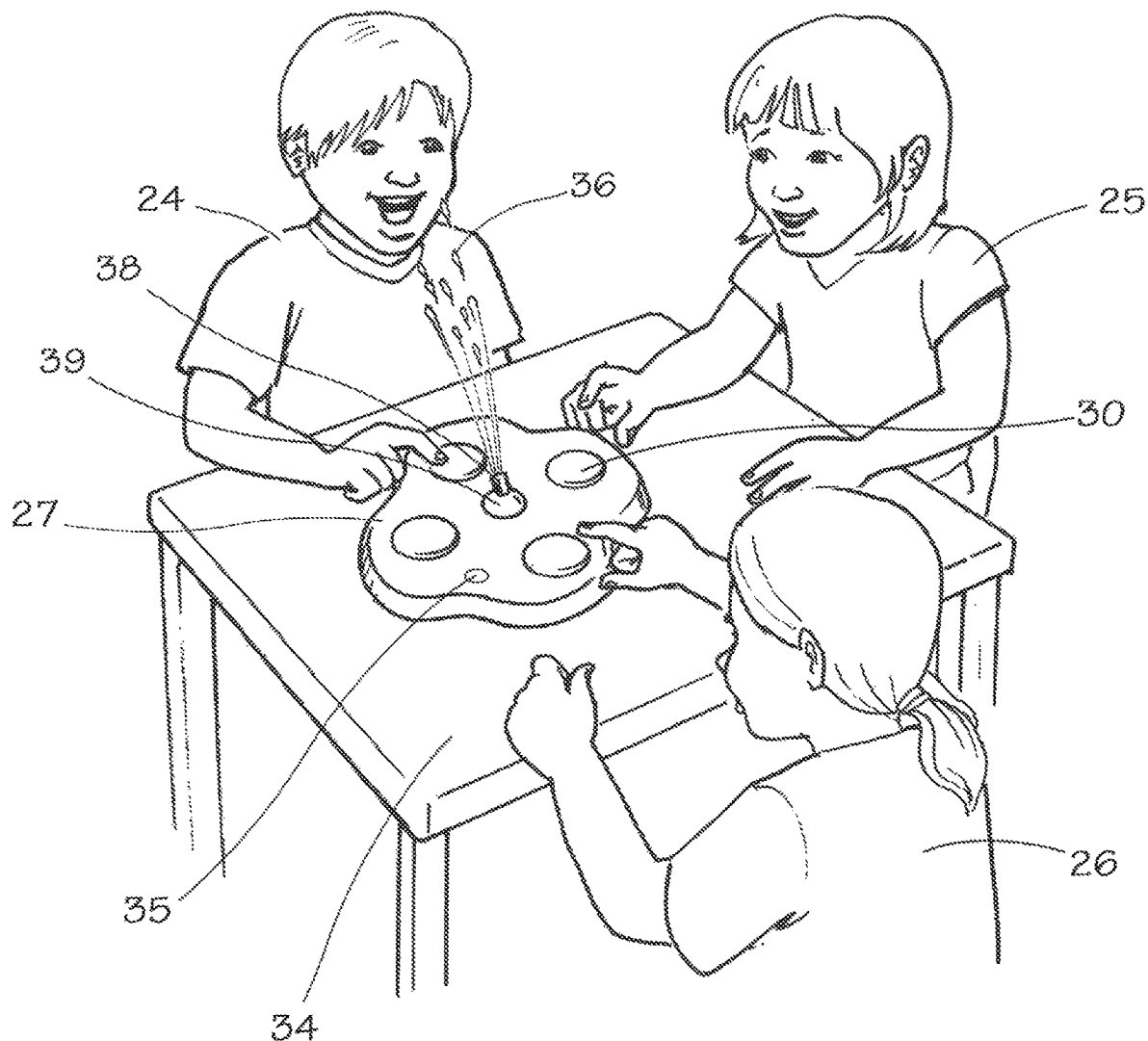
FIG. 5 illustrates a top perspective view of three players playing an electronic tabletop gaming console of another embodiment of the present invention; the embodiment of FIG. 5 does not include a playhat.

FIG. 5 illustrates a slight modification to the play pattern of the invention, in that the spray event at the conclusion of a gameplay round does not involve water 7 being released from a playhat 3, but instead has water spray 36 being sprayed at a player (in this illustration, player 24) directly from the electronic tabletop game console 27. The water container (not shown) would be inside the electronic tabletop game console 27. Prior to the beginning of a game round, a movable nozzle 38 could be pointed towards one particular player (in this example, player 24) by means of a pivotable turret 39. Alternatively, the water 7 could be directed to spray onto all players, so that gameplay would be modified to require cooperation between players so no one lost a round, to avoid all players getting sprayed. The play activity would best be played on a table 34 as earlier mentioned.

Figure 6:
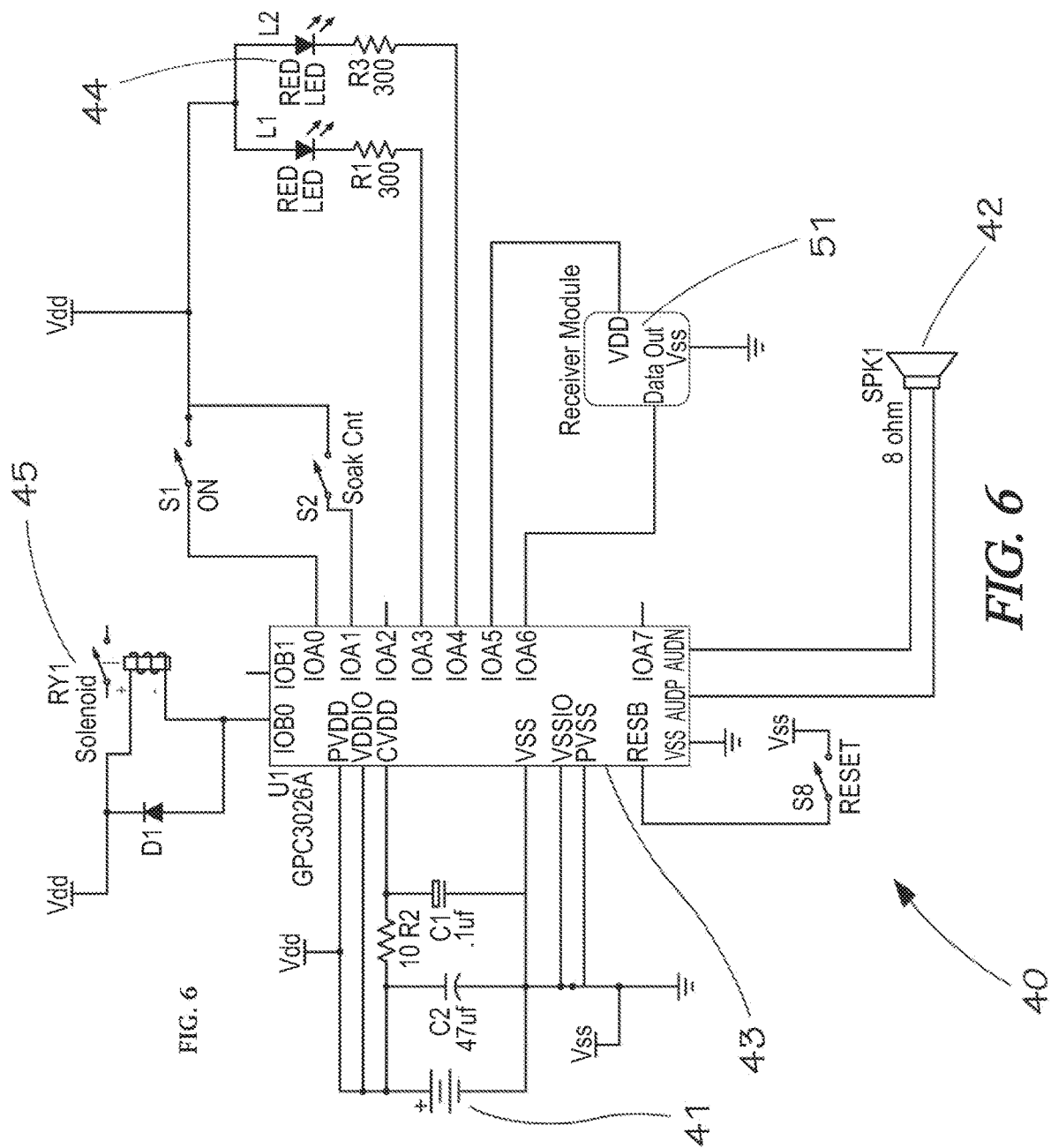
FIG. 6 is an exemplary schematic of the electronics of the playhat depicted in FIG. 1 and FIG. 2.
Figure 7:
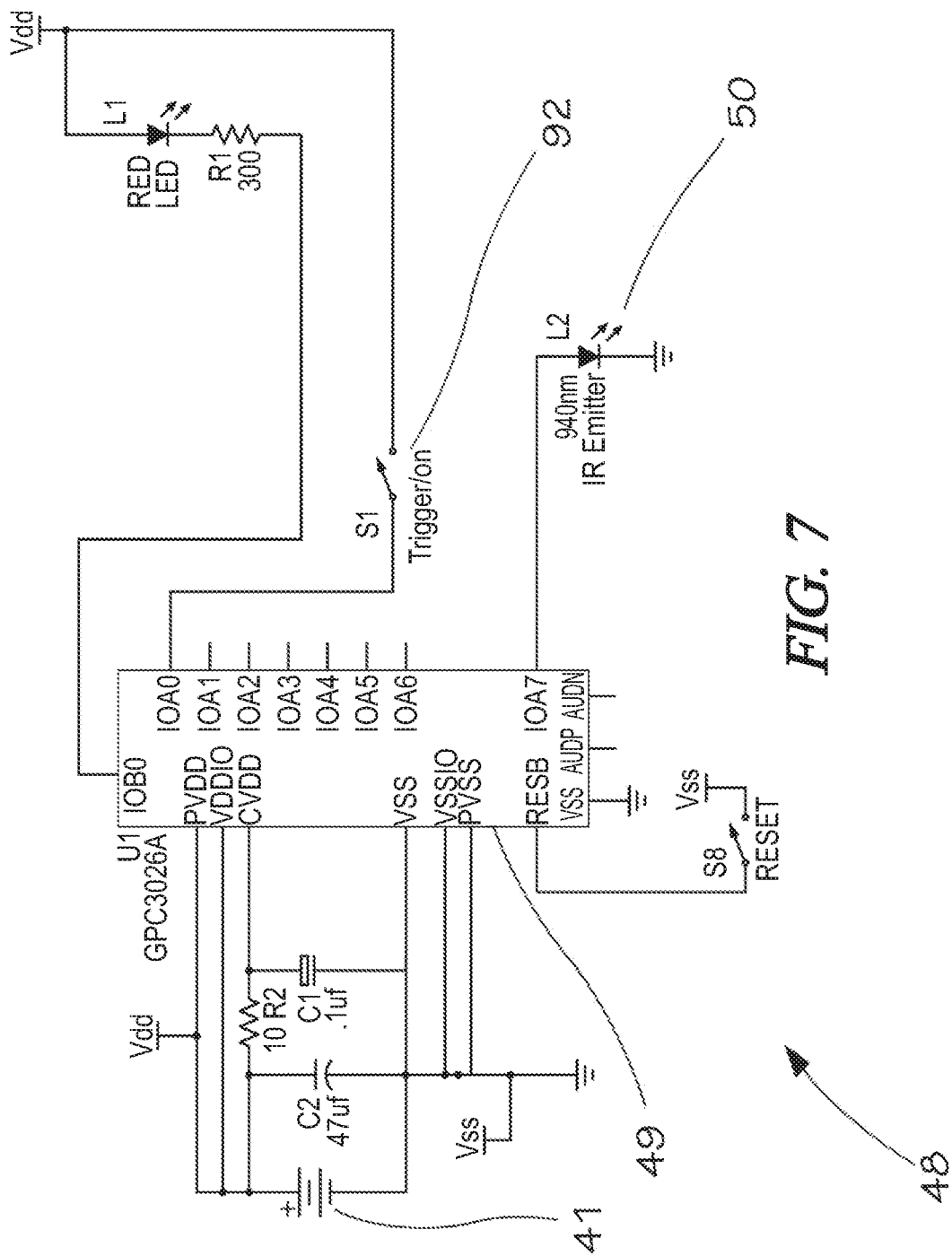
FIG. 7 is an exemplary schematic of an electronic circuit of the blaster gun depicted in FIG. 1 and FIG. 2.

FIG. 6 illustrates an exemplary schematic of the electronic circuitry 40 for the playhat 3, understandable by anyone familiar with the art of simple toy electronics. A battery or batteries 41 provides power for the circuitry 40. Said battery or batteries 41 could for example, be alkaline or nickel metal hydride, disposable or rechargeable. Lithium batteries could be utilized. Battery technology is commonly known for simple electronic toys. Voltage could preferably be 1.5 to 9 volts, direct current. These battery characteristics are representative of additional battery power sources mentioned in this patent application. Said circuitry 40 is intended to receive a wireless signal 5 (FIG. 1) when said wireless signal 5 is transmitted from a toy blaster gun 4 (FIG. 1) and received by a receiver labelled 51 in FIG. 6, initiating a series of programmed events in said playhat 3. Preferably the wireless technology utilized by the components of this invention would be infrared signal transmission and reception, as said technology is able to be directionally controlled. A speaker 42 could be provided to generate sounds when the circuitry 40 was turned on, activated during a gameplay sequence, or shut off. A circuit board 43 can be programmed to control and provide for gameplay logic, timing, and water release commands, as well as LED light 44 illumination. A solenoid controller 45 could send a signal to solenoid 82 to release water 7 from the water container 8 (FIG. 1) by moving a valve 85 (FIG. 9A). Alternative to a solenoid, a toy motor 46 (FIG. 9), for example a Mabuchi RE-280RA 6-volt DC motor 46 (FIG. 9) could be employed and activated by said circuitry 40 to activate a valve or pump 47 to release or pump water 7 onto a player's head.

FIG. 7 illustrates an exemplary schematic of the electronic circuitry 48 for the toy blaster gun 4, understandable by anyone familiar with the art of basic toy electronics. The circuitry 48 is intended to emit a wireless signal beam 5 (FIG. 1) when a player holding said toy blaster gun 4 moves trigger 15. Battery source 41 powers said circuitry 48. Circuit board 49 can be programmed to provide for wireless signal transmission when a user moves a trigger 15 (FIG. 1) activating a circuitry trigger switch 92 on said circuitry 48. A beam transmitter 50 can emit a wireless signal 5 that could be directed to the beam receiver 51 (FIG. 6). Although preferably the wireless technology utilized by the components of this embodiment of the invention would be infrared signal transmission and reception, as said technology is able to be directionally controlled, in the event radio frequency signaling is substituted, beam transmitter 50 and beam receiver 51 would, in that embodiment, be compatible with radio frequency technology.

Figure 8:
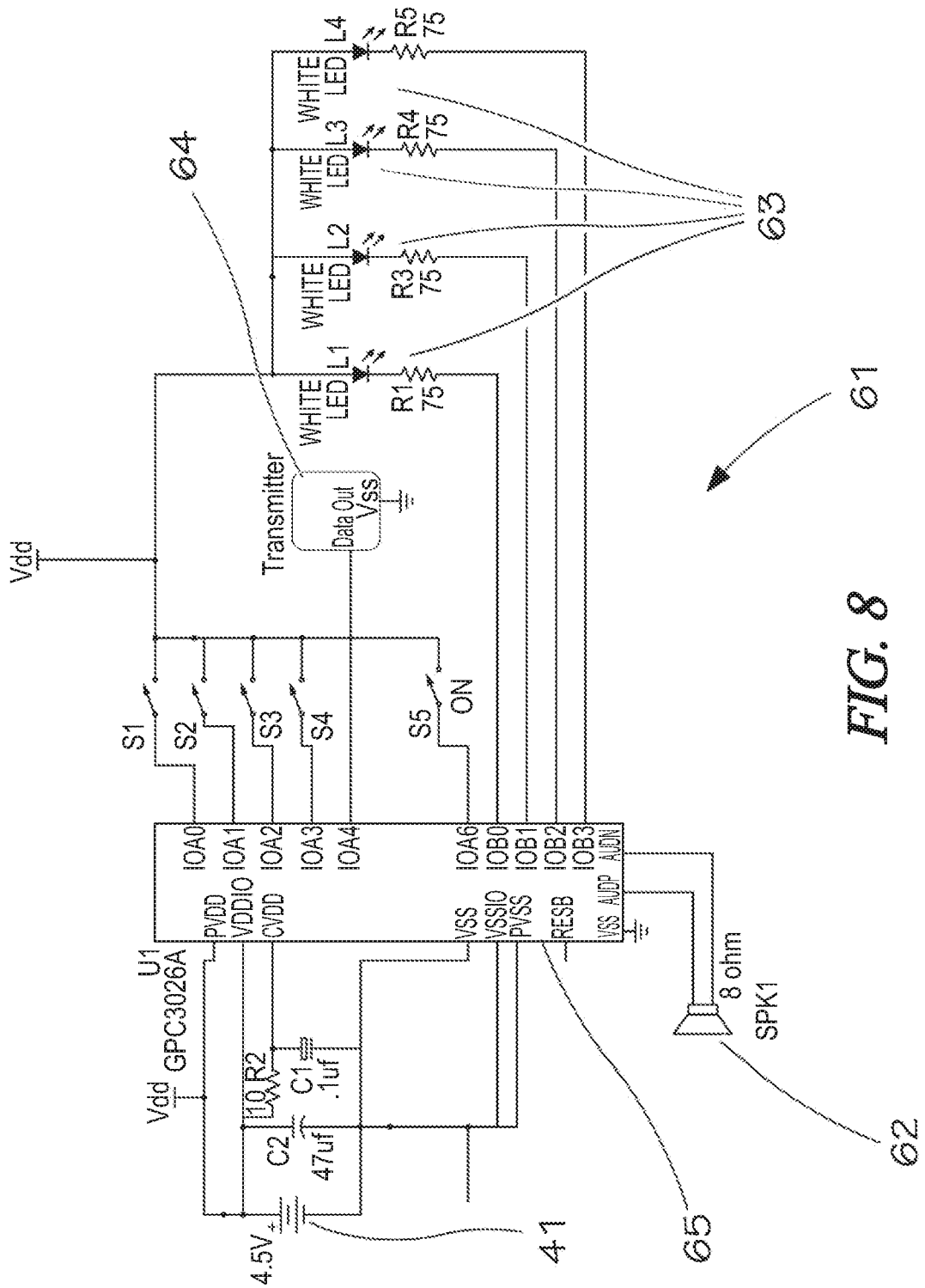
FIG. 8 is an exemplary schematic of an electronic circuit of the electronic tabletop game console depicted in FIG. 3 and FIG. 4.

FIG. 8 illustrates an exemplary schematic of the electronic circuitry 61 for the electronic tabletop game console 27, understandable by anyone familiar with the art of basic toy electronics. The electronic circuitry 61 is intended to provide gameplay activity for one to four players, requiring players to activate switches or buttons 29-32 (FIG. 3) in conjunction with game rules. For example, the programming of said electronic tabletop game console 27 could require that each player must touch-activate their respective button 29-32 within a designated time period after it has been illuminated by the circuitry 61. For example, one player of the game could be wearing the playhat 3 (FIG. 3). In this embodiment of the invention radio frequency ("RF") or Near-Field technology or Bluetooth technology, for signal transmission by console transmitter 64 might be preferred over infrared technology, since the location of the compatible receiver 6 inside the playhat 3 would vary in location as the playhat 3 might be transferred from one seated player to another seated player, in accordance with gameplay rules. For example, a player who failed to touch-activate his console button 29, 30, 31, or 32 but was not wearing playhat 3 when he failed, might then be required to wear the playhat 3 for the next round of play. In the event any player who happens to be wearing playhat 3 fails to touch-activate his button within the required time, then the circuitry 61 could generate and emit a wireless signal, represented by signal beam 5 (FIG. 3). Said signal beam 5 would be received by the receiver 6 and water 7 would release, as earlier described. The circuitry 61 could be comprised of a power source such as batteries 41, speaker 62 to emit unique sounds for each play button (29-32) and also special sounds when a spray-signal transmission event occurred. Console LED lights 63 could illuminate the buttons 29-32 (FIG. 3). In any embodiment of the invention, when one particular wireless signal technology such as infrared or radio frequency or Near Field technology was utilized in a transmitter 100, it would be understood that the receiver 6 (for example, in the helmet 3) would be of compatible technology so that wireless communication 5 was effectuated. Console circuit board 65 controls the gameplay and provides for players to select games to play and to press their buttons 29-32 at the outset of a gameplay session to designate how many players might be playing, etc. An exemplary gameplay might be preparing the playhat 3 for play by filling it with water 7 and turning on its circuitry 40 (as described earlier in FIG. 2 description). In accordance with programmed gameplay and player or players input, console transmitter 64 or gun transmitter 100 eventually sends signal to a remote receiver 6, to activate water 7 release.

Figure 9:
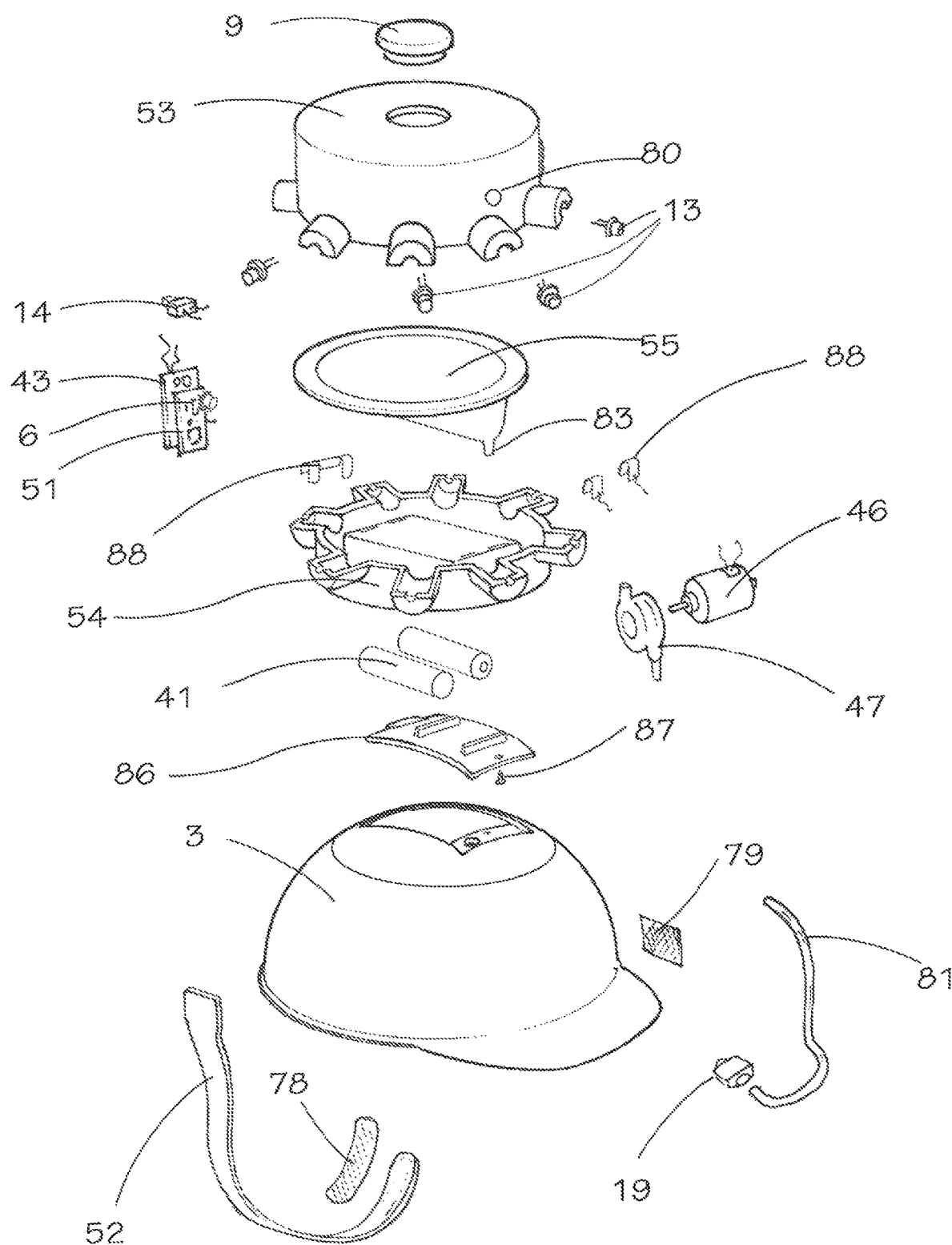
FIG. 9 is a side exploded view of the playhat depicted in FIG. 1 and FIG. 2.
Figure 9A:
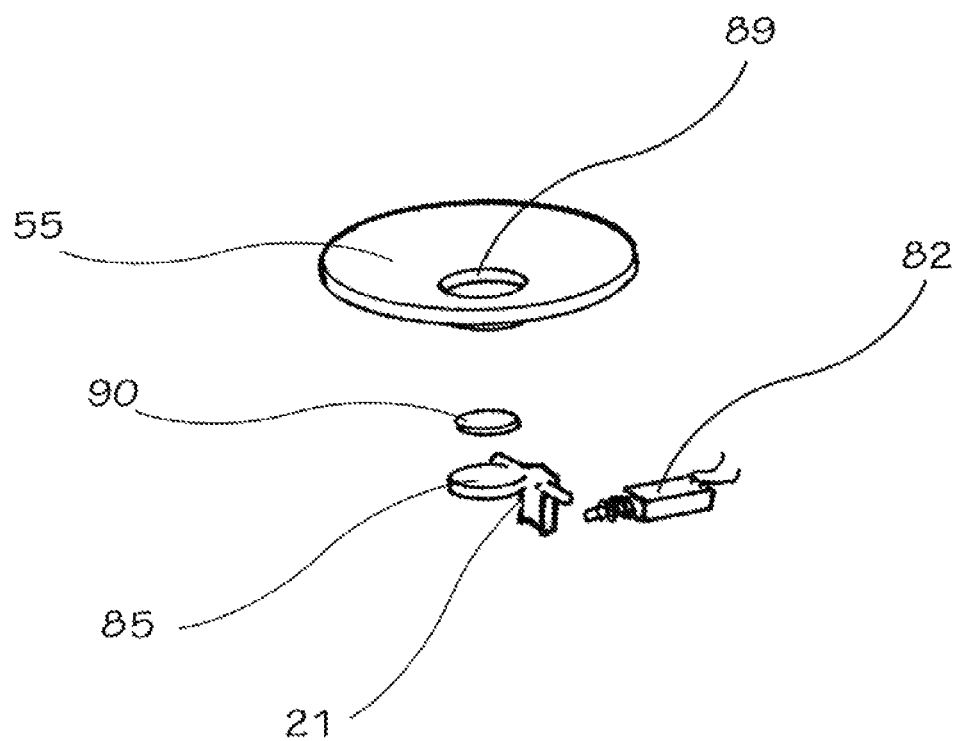
FIG. 9A is a side exploded view of components of the playhat depicted in FIG. 1 and FIG. 2.

FIG. 9 illustrates an exploded view of the playhat 3. Strap 52 can secure said playhat 3 onto a player's head, by securing around their chin via hook and loop fastener material 78 and 79, or a snap or buckle. Alternatively, an adjustable flexibly molded inner sizing ring (not shown) could be installed into the playhat 3 and then adjusted for head size fit. Container 8 (FIG. 1) may be generally comprised of top section 53 to hold water 7 and bottom section 54. Bottom section 54 would not contain water 7 in this embodiment but instead could be isolated from the water area by a reservoir bottom 55. Within bottom section 54 could be the electronic and electro-mechanical components of the playhat 3, such as batteries 41, LED's 13, an ON/OFF switch circuit board 43, signal receiver circuit board 51, etc. Coupled to said ON/OFF switch circuit board 43 may be ON/OFF switch 14 that is accessible by the wearer from the outer surface of the playhat 3, and also wireless beam receiver 6, which is controlled by receiver module 51, which could receive a wireless signal 5 from a remote wireless signal transmitter 100 as earlier described. In the event the wireless signal transmission was infrared and required line-of-sight, access portal 80 could be so molded as to directionally provide desired line of sight signal transmission receipt. When the ON/OFF switch circuit board 43 is activated, (in a preferred embodiment) a small motor 46 could activate to activate a pump 47 that would draw water 7 (not shown) from the top reservoir housing 53 and then spray that water 7 through a tube 81 and a spray tip nozzle 19, onto the wearer of the playhat 3. Proximal end of tube 81 could be coupled to the bottom of reservoir bottom outlet 83. Distal end of tube 81 may be attached to the underside of hat brim 18. Batteries 41, battery door 86, battery door screw 87, and contacts 88 are all commonly understood parts and not described in detail. FIG. 9 illustrates an alternative position, on playhat 3, for wireless signal reception, depicting wireless signal beam portal 80 and signal receiver 6 as being situated on the water container 8, as opposed to being situated on the main playhat front area, as shown in FIG. 2.

An alternative means to deliver water 7 onto a wearer of the playhat 3 could be provided by replacing the motor 46 with a solenoid 82, shown in FIG. 9A, although it should be understood that a motor and a solenoid could generally be interchanged in both FIG. 9 and FIG. 9A embodiments, and in fact are often substituted one for another in many toy applications where a small amount of energy is desired for simple parts activation. FIG. 9A further describes the substitution of a pivoting valve plate 85 that is moved to an open position by solenoid 82 to allow gravity flow of the water 7 through hole 89 at the bottom of reservoir bottom 55. If necessary, a flexible seal 90 could be installed to prevent water from leaking when pivoting valve plate 85 was in its closed position. Pivoting valve assembly 21 can be pivotably attached to molded bosses or detents in said playhat inner structure. In the embodiment wherein it is desired for water to be actively pumped out onto the user's head, a motor 46 might be more desirable than a solenoid 82. Battery compartment lid 86 is intended to allow safe access to the batteries 41 for installation and replacement. In the event rechargeable batteries 41 were to be employed, recharging could be via a recharger port, not shown but commonly understood. It is also commonly understood that batteries 41 require contacts to complete their connection to the components utilizing their power, and therefore not illustrated.

Figure 10:
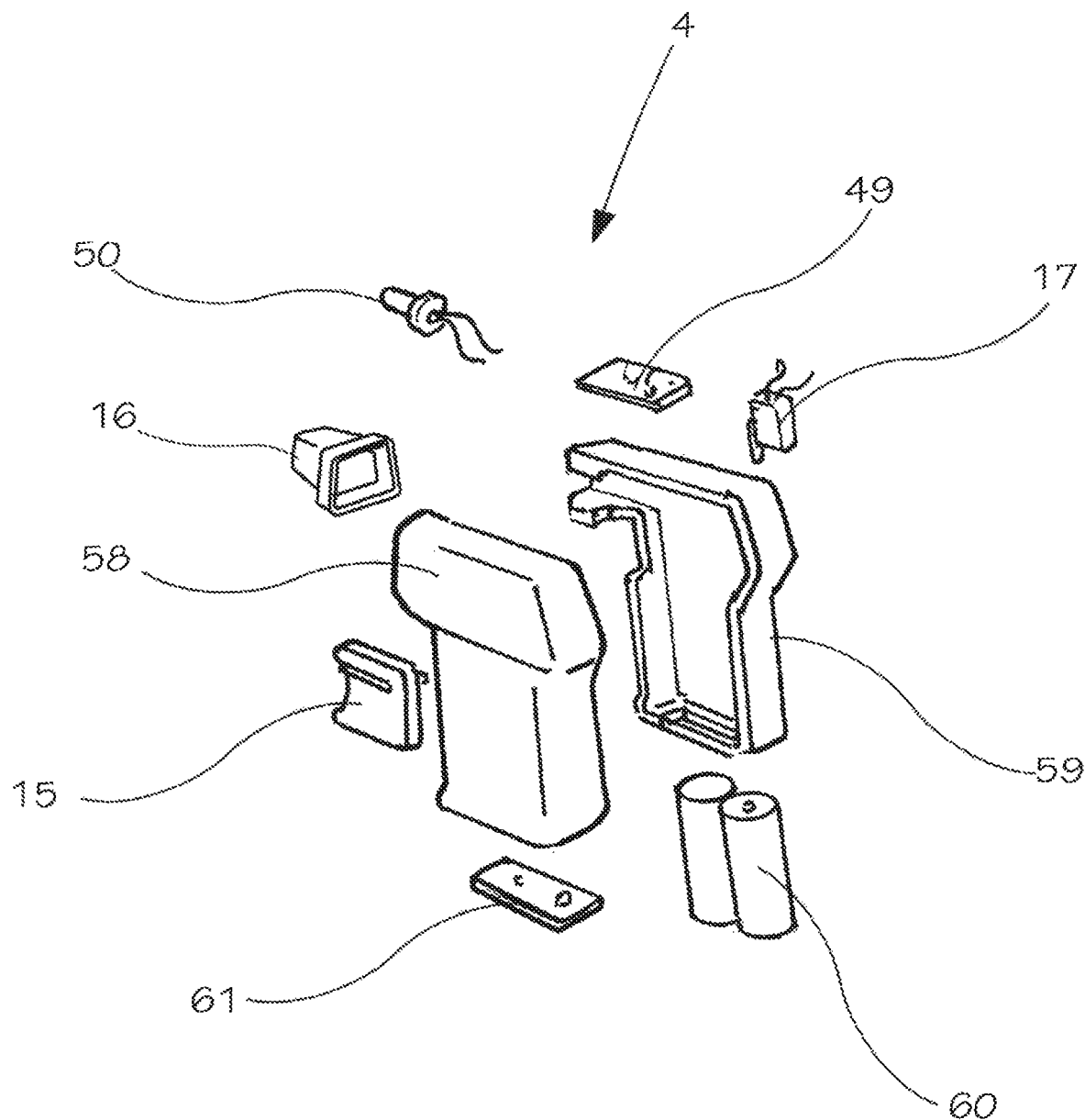
FIG. 10 is a side exploded view of the blaster gun depicted in FIG. 1 and FIG. 2

FIG. 10 illustrates an exploded parts view of the toy blaster gun 4 as shown in FIG. 1 and elsewhere. Said blaster gun 4 can include two housing halves, 58 and 59. Said halves 58 and 59 can be coupled together via solvent bond or screws, or one-time snap-together detents, to create the complete blaster gun 4. Inside said blaster gun 4 may be circuit board 49 and batteries 60. Coupled to said circuit board 49 and accessible from the outside of said housing halves 58 and 59 may be a movable trigger 15 that is configured to control signal beam 5 transmission, a master ON switch 17 that would power said circuit board 49 on or off, and an open front tip section 16 to allow wireless beam egress for signal beam 5 (FIG. 1) transmission towards the electronic signal receiver 6 in playhat 3 (FIG. 1). Battery door 61 could be removable to allow safe access to batteries 60, which may be coupled to and provide power to circuit board 49.

Figure 11:
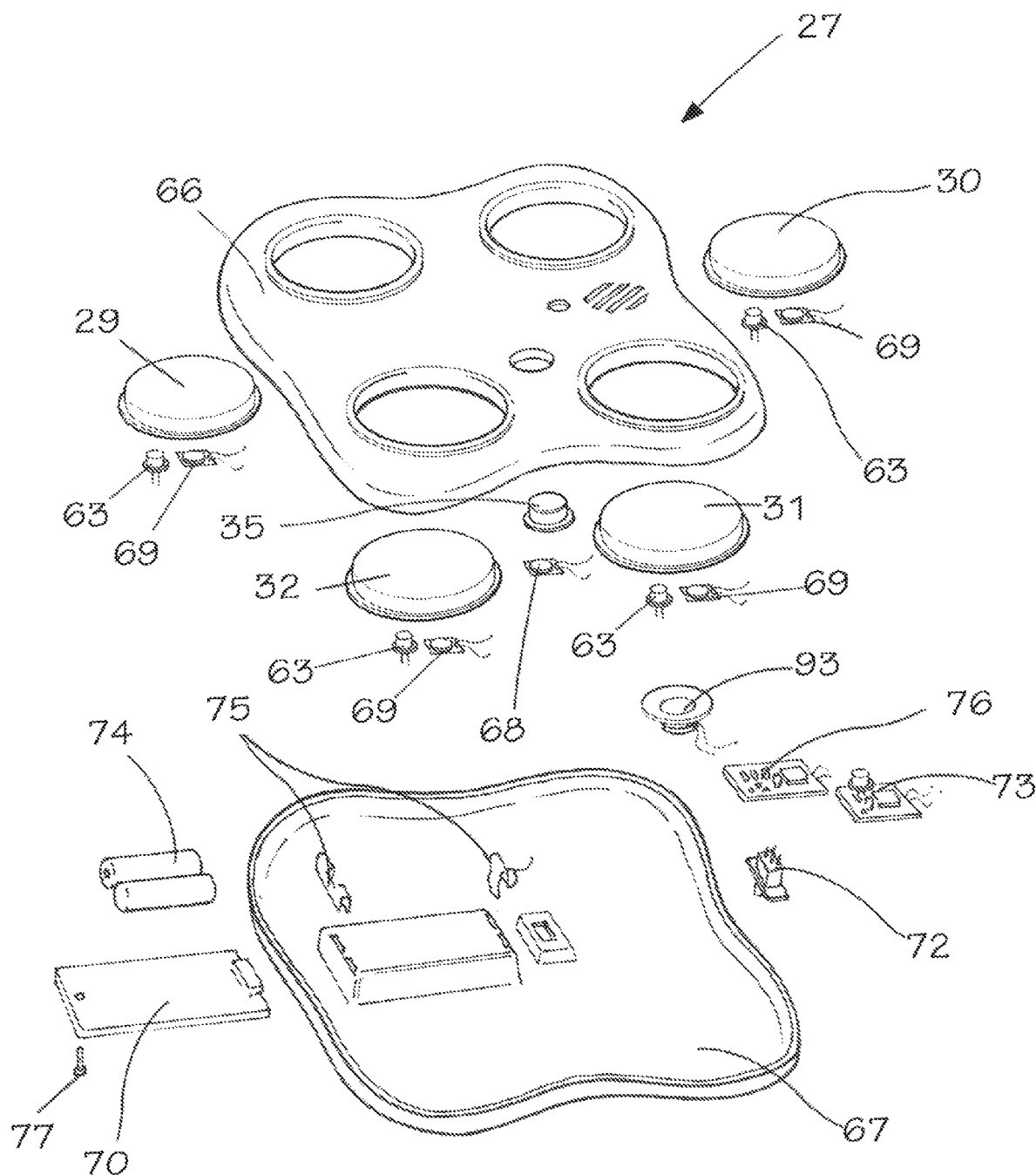
FIG. 11 is a side exploded view of the electronic tabletop gaming console depicted in FIG. 4.

FIG. 11 is an exemplary parts breakdown of an electronic tabletop game console 27. Game console housing top 66 and housing bottom 67 could be molded of plastic and could be solvent bonded or screwed together. Electronic tabletop game console 27 could include play buttons 29, 30, 31 and 32 that can be depressed by a player or players to activate their respective switches or micro switches 69. System button 35 could be activated by the players to select a particular gameplay, and to begin the play of a play round, by activating micro switch 68. A master ON/OFF switch 72 could be positioned elsewhere on the electronic tabletop game console 27. Battery door 70 may be retained in position by screw 77 and then removed to access or replace or recharge batteries 74. Wireless signal transmitter board 73 and circuit board 76 may be contained inside electronic tabletop game console 27. Battery contacts 75 are also illustrated. Console speaker 93 can emit unique sounds corresponding to play sequences, correct or incorrect input by players, timing actions, and/or wireless signal transmission (when water-release signal 5 has been transmitted).

The power source for the toy blaster gun 4, electronic tabletop game console 27, and playhat 3 is preferably batteries, however, these components, particularly, electronic tabletop game console 27 could be powered by a wall outlet.

Optionally, the receiver 5 and/or transmitter 100 described herein are transceivers capable of bi-directional communication. For example, in an embodiment of the invention, bi-directional communication takes place between playhats 3 and electronic tabletop game consoles 27 or other physical components. For example, it could be desired that one playhat 3 communicated to another playhat 3 so that the second playhat 3 responded uniquely to a signal from the first playhat 3. To achieve such bi-directional communications receivers 5 and transmitters 100 of the invention, as described herein, could be replaced by transceivers. Thus, the word "receiver" as used herein encompasses both receivers and transceivers. Likewise, "transmitter" as used herein encompasses both transmitters and transceivers.

In some embodiments, the user indirectly or directly manipulates a "switch." The user may so manipulate the switch by activating the circuitry 40, 48, and 61, or components therein. For example, a user could depress, or fail to depress, a button 29-32, which in turn activates a switch within the electronic tabletop game console circuitry 61, causing the electronic tabletop game console circuitry 61 to generate and emit a wireless signal 5. Alternatively, a switch within playhat 3 could activate the playhat circuitry 40 and cause motor 46 to activate a valve or pump 47 to release or pump water 7 onto a player's head.

The Embodiments of FIGS. 12-23

FIGS. 12-23 illustrate an embodiment of a gameset 200 that is particularly adapted to virtual reality represented by image 211 (FIG. 18), mixed reality and augmented reality.

Figure 12:
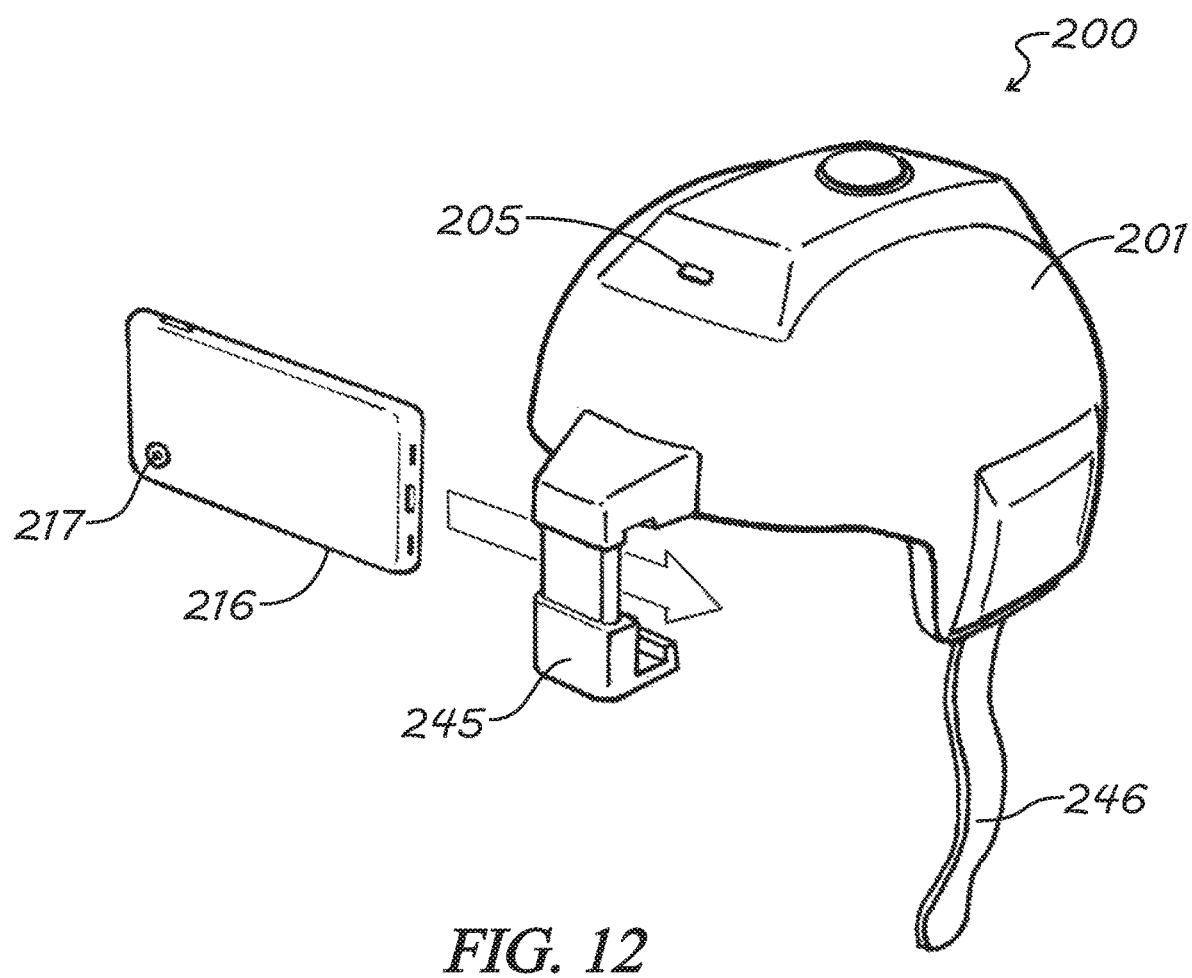
FIG. 12 is a perspective view of exemplary headgear that includes an adjustable bracket to provide removable attachment of a smartphone.
Figure 14:
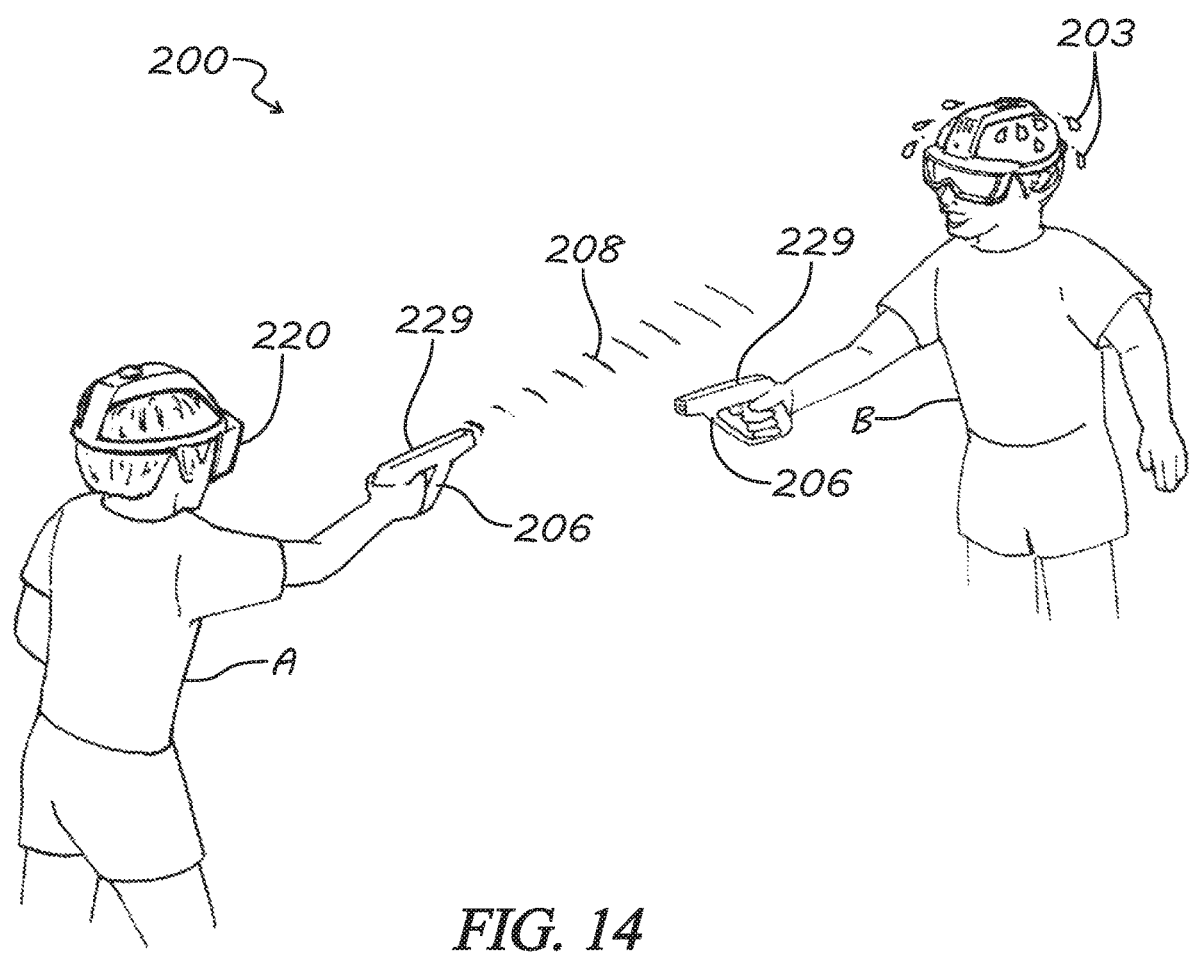
FIG. 14 is a perspective view depicting two players of the system of the invention in the same location, both wearing headgear of the game system and one player experiencing water penalty.
Figure 15:
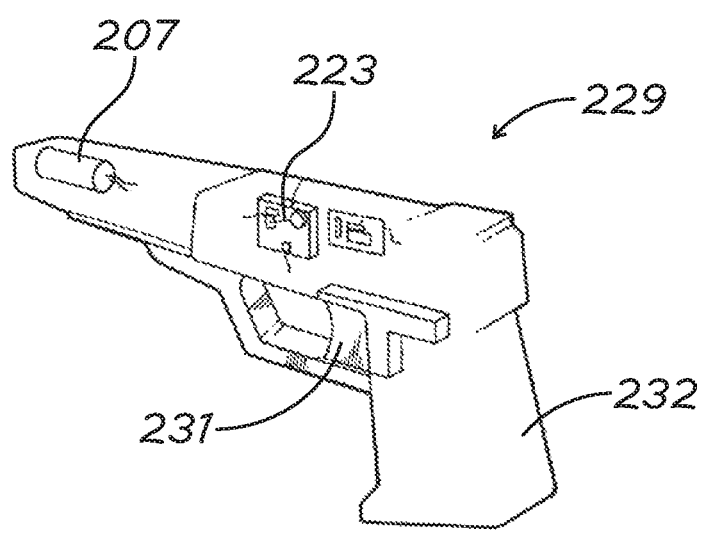
FIG. 15 illustrates a handheld controller in the shape of a toy blaster gun.
Figure 16:
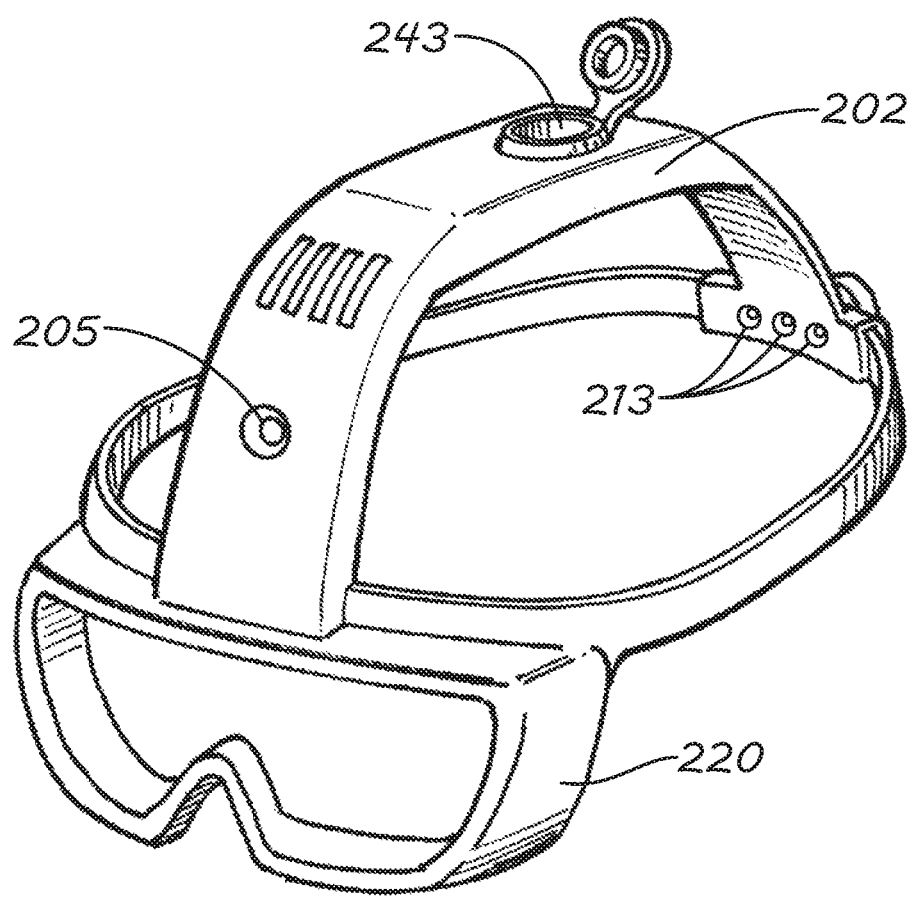
FIG. 16 is an exemplary depiction of more skeletally structured headgear, with fill port and exit port for liquid.

More particularly, in some embodiments, as shown in FIGS. 12-23, the present disclosure provides a gameset 200 configured to emit a liquid 203 onto a player. The gameset 200 may include: headgear 201 configured to be worn on a head of a player and comprising a liquid reservoir 202 (FIG. 16) configured to hold a liquid 203 and an electronic display 204 configured to visually present imagery 211 to the player's eyes (e.g., above, below or in front of the player's eyes—FIG. 17 and FIG. 18); a receiver 205 coupled to the headgear 201; a remote device 206 comprising a transmitter 207 configured to transmit a signal 208 to the receiver 205; and/or one or more power sources configured to power the transmitter 207, the electronic display 204 and the receiver 205. Optionally, upon reception of the signal 208 from the transmitter 207, the receiver 205 is configured to activate dispensing of liquid 203 from the liquid reservoir 202 onto the player's head. As used in the context of FIGS. 12-23, "headgear" is intended to encompass, without limitation, hats, headsets, head-mounted displays, helmets, eyewear such as goggles, and the like. Eyewear and goggles can be transparent, semi-transparent or opaque, depending upon the embodiment of the invention and whether the embodiment provides for augmented or virtual reality, as well as whether the embodiment provides a wearer visual access to an internal electronic display, or visual access to a remote display, such as a computer monitor or external smartphone electronic display. Referring back to receiver 205, FIG. 12 and FIG. 16 illustrate an external receiver that would be preferred to receive a transmitted signal such as an infrared signal. It is understood that other wirelessly transmitted signals that could be utilized in the invention might be radio-frequency, or Bluetooth, etc. which would not require direct line-of-sight communication with a transmitter, in which cases receiver 205 might be an internal component.

Figure 17:
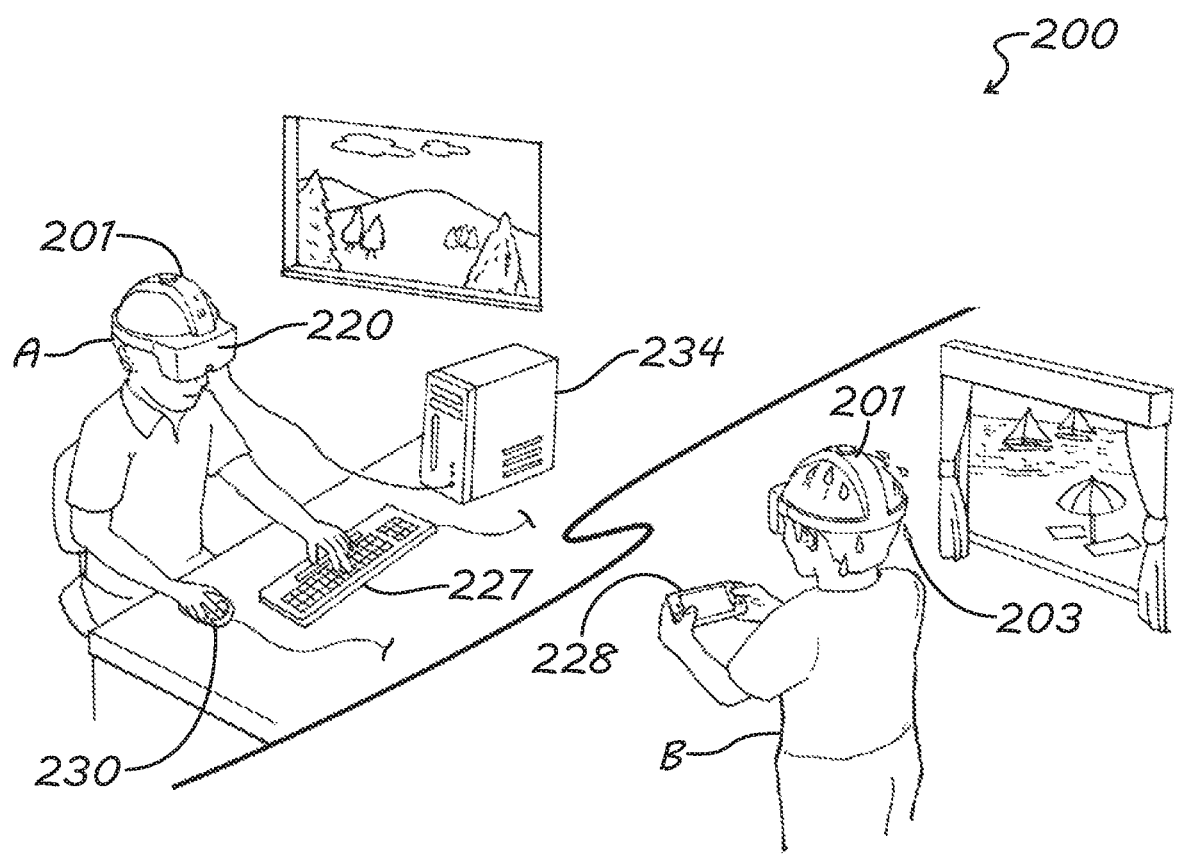
FIG. 17 is an illustration of two players in remote locations, one at a computer and keyboard and one holding a handheld controller of the invention.

Optionally, the signal 208 is a wireless signal. FIG. 17 depicts a seated Player A whose headgear 201 is attached via a wired connection to receive a signal from a computer being employed in this embodiment of the invention. It is at the same time to be understood by anyone skilled in the art that the transmission of data from one remote device (ex: a computer in New York City) to another player's computer or smartphone in another location (ex: Wyoming) could involve both wireless and wired communication between players of gamesets 200 of this invention.

Optionally, the electronic display 204 (FIG. 13 and FIG. 18) is coupled to a processor and visually presents to the player virtual reality imagery, augmented reality imagery, or mixed reality imagery generated by the gameset 200. Optionally, the headgear 201 further comprises a speaker and microphone (microphone not shown—which may be used to capture words or sounds emitted by the player). Optionally, the headgear 201 further comprises a mobile phone 216 comprising the electronic display 204, a speaker, a camera 217 and a microphone. Optionally, for the embodiment of augmented reality play, the mobile phone 216 (FIG. 13) is configured to be located above the player's eyes and the headgear 201 comprises a reflective surface in the form of a transparent or semi-transparent plate 219 configured to be angled and located below the mobile phone 216 in the line of sight to the wearer so that a reflected image from said mobile phone 216 to said plate 219 can be viewed by the wearer as the wearer looks through said transparent or semi-transparent plate 219 with transparent image to simultaneously observe the actual environment in front of his eyes, the result being a combined visual presentation of augmented reality. For the embodiment of virtual reality play, there is no requirement for transparent or semi-transparent plate 219, and the mobile phone 216 is located in front of the player's eyes. There are several directions of development for augmented reality display, including but not limited to OST (optical see through) and VST (video see through). These displays could also be utilized in the headgear 201 of the invention, and are explained online at: https://blog.protypr.io/understanding-display-techniques-in-augmented-reality-c258b911b5c9. For purposes of this invention, the technology illustrated for the display 204 is not critical as it is not being claimed. Display technology options are cited as reference to the workability of the release of liquid 203 upon receipt of a wireless signal 208, and offered as background information.

Regardless as to its location in the headgear, optionally the mobile phone 216 is removably attached to the headgear 201 (e.g., by a bracket 245). Optionally, the headgear 201 comprises eyewear 220 comprising the electronic display 204 and a hat comprising the liquid reservoir 202. Optionally, the eyewear 220 is in the form of goggles that may include a strap 246 to extend around the player's head. Optionally, the gameset 200 further comprises a motion sensor, an attitude sensor or an accelerometer 223 that may, for example, detect positioning/movement of the player, headset 201 or blaster gun 229. Optionally, the motion sensor, the attitude sensor or the accelerometer 223 is coupled to the headgear 201. Optionally, the gameset 200 further comprises a controller unit 228. The controller unit 228 in FIG. 20 and FIG. 21 may include a joystick or joysticks, represented by elevated and movable button-like circular units 226. A toy blaster gun 229 or a computer mouse 230 may function as controller units in other embodiments, and may include switches or sensors that will function to generate signals transmitted to a receiver of the invention. Optionally, the controller 228 further comprises a motion sensor, an attitude sensor or an accelerometer 223. One controller unit in FIG. 17 is numbered 227, a keyboard, to differentiate it from a smartphone, 228 in the same FIG. 17, that also can function as a controller. Optionally, the gameset 200 further comprises a toy blaster gun 229 (FIG. 15) comprising a trigger 231 and a handle 232. Optionally, the gameset 200 further comprises a camera (not shown) aimed toward the player to capture video or still image of the player. A smartphone in an embodiment of the invention could provide camera capabilities, or a separate small digital camera might be mounted in a headset of the invention. Optionally, a camera on a computer screen of the invention could record an image of a player. Optionally, the camera 217 is coupled to the headgear 201. Optionally, the gameset 200 further comprises a computer 234 and further wherein the gaming console is coupled to the camera 217. Optionally, the headgear 201 is waterproof. Optionally, the headgear 201 further comprises a valve 237 configured to control release of the liquid 203 from said reservoir 202. Optionally, the valve 237 is controlled by a solenoid or by a motor and further wherein upon reception of the signal from the transmitter 207, the receiver 205 is configured to cause liquid 203 from the liquid reservoir 202 to be dispensed downward onto the player's head, said dispensing aided and not hindered by gravity. Optionally, the gameset 200 further comprises a first computer 234 comprising the transmitter 207 and a first computer processor and wherein the gameset 200 further comprises a second computer 234 comprising the receiver 205 and a second computer processor. Optionally, the headgear 201 further comprises a fill port 243 configured to allow the player to fill the liquid reservoir 202 with a liquid 203 and an exit port 213 (FIG. 16) configured to allow the liquid 203 to exit from the liquid reservoir 202. Optionally, the gameset 200 comprises a computer 234.

In still further embodiments, the present disclosure provides a method of play involving one or more players comprising the steps of: a) providing the gameset 200; b) placing the headgear 201 on the player's head; c) transmitting a signal 208 to the receiver 205; and d) dispensing liquid 203 from the liquid reservoir 202 onto the head of at least one player wearing the headgear 201 in response to the receiver 205 coupled to such player receiving the signal 208.

Optionally, the electronic display 204 is coupled to a processor and visually presents to the player wearing said headgear 201 virtual reality imagery, augmented reality imagery, or mixed reality imagery.

In still further embodiments, the present disclosure provides a method of play involving two or more players comprising the steps of: a) providing the gameset 200 with liquid having been filled into reservoirs on the gameset headgear 201 of one or more players; b) placing headgear 201 on the head of a first player and placing the headgear 201 on the head of a second player; c) transmitting a signal 208 from a controller controlled by said first player to a receiver 205 coupled to said second player's headgear 201; and d) dispensing liquid 203 from the liquid reservoir 202 onto the head of said second player in response to the receiver 205 coupled to said second player's headgear 201 receiving said signal 208.

In still further embodiments, the present disclosure provides a method of play comprising the steps of: a) providing the gameset 200 that includes a liquid reservoir 202 filled with liquid 203, wherein the gameset 200 comprises a computer 234; b) placing headgear 201 on the head of a first player and placing the headgear 201 on the head of a second player; c) transmitting a signal 208 from the computer 234 to a receiver 205 coupled to said second player's headgear 201; and d) dispensing liquid 203 from the liquid reservoir 202 onto the head of said second player in response to the receiver 205 coupled to said second player's headgear 201 receiving said signal 208 from said computer 234.

In still further embodiments, the present disclosure provides a gameset 200 that displays an electronic image to a player, said gameset 200 configured to emit a liquid 203 onto a player's head upon reception of a signal 208 by a receiver 205 from a transmitter 207, said receiver 205 configured to activate the dispensing of said liquid 203 from a liquid reservoir 202 coupled to said player's head.

In still further embodiments, the present disclosure provides a gameset 200 that displays an electronic image to a player, said gameset 200 configured to activate a haptic event by example low-volt shock or vibration of a small motor 240 onto a player's head upon reception of a signal 208 by a receiver 205 from a transmitter 207.

In the still further embodiments, the present disclosure provides a gameset 200 configured to emit a liquid 203 onto a player comprising: headgear 201 configured to be worn on a head of a player and comprising a liquid reservoir 202 configured to hold a liquid 203; an electronic display 204 configured to visually present imagery to the player's eyes; a receiver 205 coupled to the headgear 201; a remote device comprising a transmitter 207 configured to transmit a signal to the receiver 205; and one or more power sources configured to power the transmitter 207, the electronic display 204 and the receiver 205. Optionally, upon reception of the signal from the transmitter 207, the receiver 205 is configured to activate dispensing of liquid 203 from the liquid reservoir 202 onto the player's head.

In the still further embodiments, the present disclosure provides a gameset 200 configured to emit a liquid 203 onto a player comprising: headgear 201 configured to be worn on a head of a player and comprising a liquid reservoir 202 configured to hold a liquid 203; a power source; an electronic display 204 configured to visually present imagery to the player's eyes; wherein, upon activation, the liquid reservoir 202 is configured to dispense liquid 203 onto the player's head.

In the still further embodiments, the present disclosure provides a method of dispensing liquid 203 onto a player comprising: a) providing a gameset 200 configured to emit a liquid 203 onto a player comprising: headgear 201 configured to be worn on a head of a player and comprising a liquid reservoir 202 configured to hold a liquid 203; a power source; an electronic display 204 configured to visually present imagery to the player's eyes; b) placing the headgear 201 on the player's head and visually presenting imagery to the player's eyes; and c) dispensing liquid 203 from the liquid reservoir 202 onto the player's head.

FIGS. 12-23 will now be described with more particularity.

FIG. 12 illustrates a molded helmet-shaped headgear 201 embodiment that contains a fill port 243 with a removable cap to provide for the filling of a reservoir 202 with a liquid 203 (preferably water), a retention strap 246 so that the player might not lose the headgear 201 during active play, and a size-adjustable spring-loaded or thread-to-tighten bracket 245 could provide for secure positioning and retention of a smartphone 216 to send and receive wireless signals 208 and data transmission for the gaming activity, and to display digital imagery of the gaming activity to the player wearing the headgear 201. In FIG. 12, the mobile phone (e.g., smartphone) 216 is positioned directly in front of the eyes of the player, so that the gaming experience is virtual reality represented by the displayed image 211 (FIG. 18), with the actual environment (for example backyard or bedroom) of the player playing the game not visible to the player. It is understood that virtual reality gaming headgear 201 may instead of a smartphone display 204, comprise a dedicated digital screen, fixed in place, so that a smartphone 216 would not be required. This is well known to anyone skilled in the art. Headgear 201 could contain speakers for sounds as well as communication between players. Speakers and microphones (not shown) could be integral to a smartphone 216 or else dedicated elements of the headgear 201. In an exemplary embodiment, headgear 201 is in the form of a head-mounted display (HMD).

Headgear 201 can be as structurally complete as a helmet (FIG. 12) that covers most or all of a player's head, or can be skeletal in structure (FIGS. 14 and 16), or can be as minimalistic as simulating ear-worn "glasses" 220 with small liquid reservoirs 202 on the temples or front eyeglass portion 220 (FIG. 19), to release liquid 203 preferably water onto the player/wearer. Electronic componentry could be inside the enlarged eyeglass 220 frames.

Figure 13:
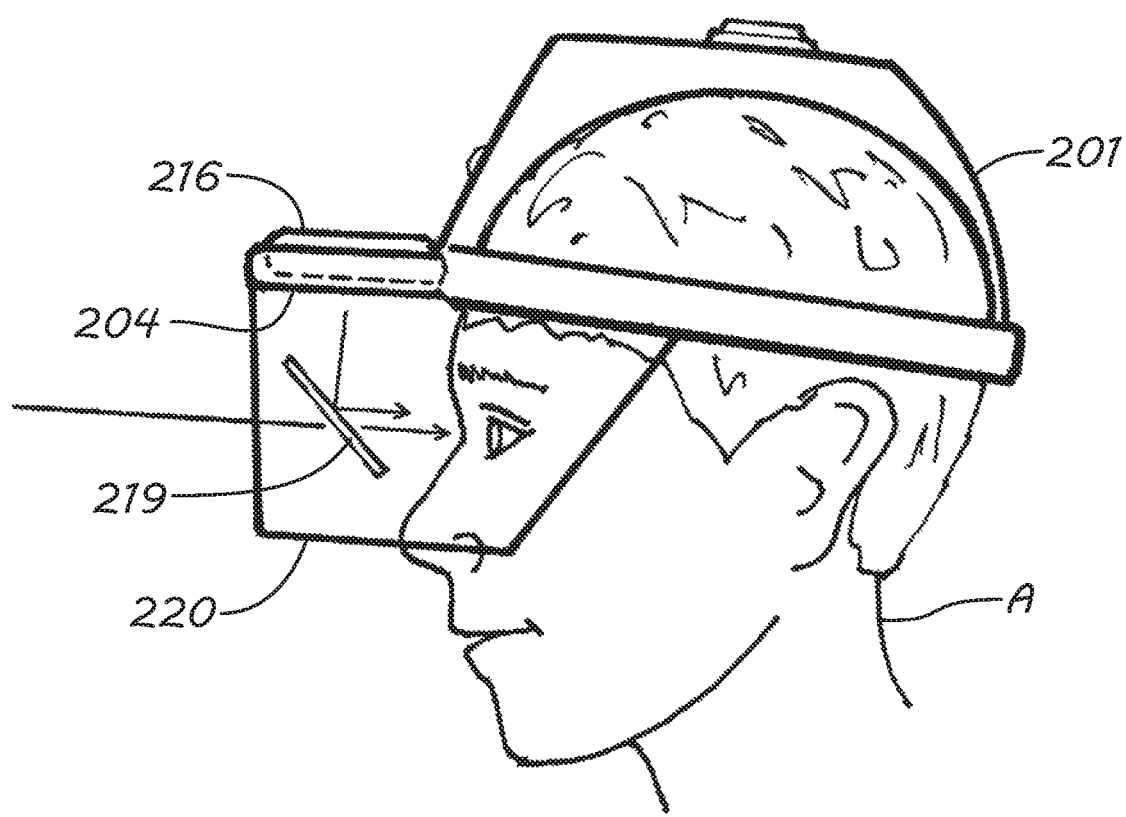
FIG. 13 is sideview of headgear that illustrates the placement and location of a reflective surface in the line of sight of the wearer of the headgear.

FIG. 13 depicts headgear 201 wherein an angled semi-transparent plate 219 is positioned in the line of sight of the Player A, so that a digital gaming image projected downward from the electronic display 204 of a smartphone 216 or other projection source is able to be viewed by the wearer simultaneously with the Player A seeing through that projected image to observe the actual surroundings in which the player is playing the game of the invention. Such dual imagery (projected and real-time) is augmented reality, as earlier described herein this application.

Headgear 201 is preferably injection molded plastic such as high impact styrene or polycarbonate or polypropylene, and can comprise a goggle section 220 and an electronic receiver 205 and a power source such as a battery.

Wireless signals 208 transmitted to receivers 205 in varying headgear 201 of the invention can be generated by a variety of alternative components of the system, including handheld blaster guns 229, tabletop game consoles 228, computer keyboards 227, and other well-known dedicated game controllers. All can be activated by an array of one or more triggers 231, joysticks 228, keys or buttons. Such alternative gaming componentry is well known to those knowledgeable in the art of digital gaming and digital gaming equipment. FIG. 14 illustrates two exemplary players (Player A and Player B) of the gameset 200. They may be engaged in a competition involving augmented reality gaming or virtual reality gaming. Each player is holding a blaster gun 229 and pointing their blaster gun 229 at their opponent. Each player has a digital image presented in front of their eyes, or a digital image reflected into their line of sight as previously described as an augmented reality component. Digital image display can be by means of a digital screen as might be included in a smartphone 216 removably coupled to their headgear 201, or by means of a digital screen fixably attached to their headgear 201. In this instance an opponent holding a blaster gun transmitter 207 could emit a wireless signal 208, such as an infrared signal 208, towards a signal sensor on his opponent's headgear 201. The top section of each player's headgear 201 contains a liquid container/reservoir 202 that can be filled through a fill port 243 (FIG. 16) by the players prior to the beginning of play. Each headgear 201 unit can contain a power source and a small circuit board that is programmed to activate the release of liquid 203 from the liquid reservoir 202 upon reception of a wireless signal 208 from another device of the gameset 200. One player of the competition illustrated in FIG. 14 is in the process of having water 203 released onto his head represented by graphical droplets.

Optionally, the remote device is a toy gun 229 (often referred to as a "blaster") comprising a handle 232 and a trigger 231 connected to the handle 232, and depressing the trigger 231 is configured to transmit the wireless signal 208. FIG. 15 illustrates a small, exemplary handheld "blaster" gun 229 of the invention. The blaster 229 could be any size, to simulate even a large-sized weapon for themed play. It can contain a power source such as a battery, a small integrated circuit board providing the capability to send a wireless signal 208, a trigger 231 to activate signal 208 sending, a speaker (e.g., piezo speaker) for sound generation, lights, an infrared light source that can activate a signal 208 on another remote device 206, etc. The toy gun 229 could also contain a motion sensor, attitude sensor or accelerometer 223 so that the position of the blaster 229 and the movement of the blaster 229 could be detected and transmitted to other components of the gameset 200, for purposes of determining accuracy, timing, etc. The wireless signal 208 can be Bluetooth or Wi-Fi signal, although it could also be Nearfield or similar wirelessly transmitted signal 208. In certain gaming embodiments, for example as described above in FIG. 14, the directed-beam of an infrared signal might be preferred for its directionality. In one embodiment, instead of a blaster gun 229, the remote device 206 is a console that further comprises at least one button configured to activate an electronic switch. The remote device 206 can be a mobile phone 216. Optionally, the headgear 201 is further configured to emit lights, sounds or combinations thereof in response to the receiver 205 receiving the wireless signal 208. Optionally, the receiver 205 and transmitter 207 are transceivers capable of bi-directional communication. Optionally, the reception of a wireless signal 208 transmitted from a remote device is accomplished by the inclusion of a smartphone 216 coupled to or positioned inside the headgear 201 or wirelessly in communication with the headgear circuitry, for example by 802.11 b/g/n wireless internet access.

FIG. 16 illustrates a more skeletal structure of headgear 201. The liquid fill port 243 is preferably located atop the headgear 201 and can include a hinged fill cap. An exit port 213 can be positioned at the rear of the headgear as shown.

Exit port 213 could be multiple exit ports distributed around the inside of the headgear 201 so that liquid from the liquid reservoir 202 might fully soak a player when liquid release was activated.

A player would open the cap of the fill port 243 (FIG. 16) and pour liquid 203 into the reservoir section 202 of the hollow, top-most headgear section. A receiver/sensor 202 could be positioned at the front of said top brace to receive a wireless signal 208 from a blaster gun 229 of the system, or from another device of the gameset 200. It can be any wireless signal 208 as described earlier. Inside the structure of the skeletal headgear 201 could be a small power source such as a battery, a printed circuit board, a speaker, etc. as earlier described. "Goggles" 220 could be positioned in front of the eyes of the wearer and the inside of said goggles 220 could contain an electronic display 204 to present an image of the gaming activity to the player/wearer.

Alternatively the front eyewear section 220 could be without any lenses or any display 204, with the player/wearer looking through eye openings, so that a player wearing headgear 201 might sit in front of a computer monitor or other remote screen, or hold in their hand a smartphone 216, and participate in the gaming event. Alternatively, and in this embodiment, there is not even any "eyewear" framing in front of the wearer of headgear 201. The head strap 246 of the headgear 201 could be size adjustable.

FIG. 17 illustrates two (or more) players being enabled to compete in a gaming activity while being situated physically remote one from the next, one player's environment (Player A, seated) and his location being exemplified by a window showing a boat on water, the other player's window showing a mountain-scape. Player B is standing and exemplifies headgear 201 in the form of a wireless headset that can send and receive signals via Bluetooth or Wi-Fi or similar protocol, to a smartphone 228 being held by that same player. The smartphone 228 could then send and receive signals wirelessly via telephone or Wi-Fi or Bluetooth protocols via the internet. His opponent Player A may be seated in front of a computer keyboard 227, playing via keyboard commands or via a joystick or computer mouse 230. The seated player's headset 201 can comprise a permanent or a removably attached electronic display to present an image of the game to the eyes of the player (Player A), or his headgear 201 could have clear goggles so that he could see an image displayed on a computer screen in front of him (not shown). As both Players A and B participate in the digital gaming experience, their responses and action, either physical (body movement) or console/controller-based (described herein as joystick 226 or button or keyboard 227 activated), can influence, direct and affect their gaming status as well whether they might win or lose a competition, at which time liquid release might be activated onto the head of a losing player, from his headgear 201. This kind of activity and technical gaming experience, except for the unique and entertaining penalty of water release, is well known to anyone skilled in the art. In the event players are physically present in the same room or building, they could communicate via the same Wi-Fi router, and not require an internet connection.

Figure 18:
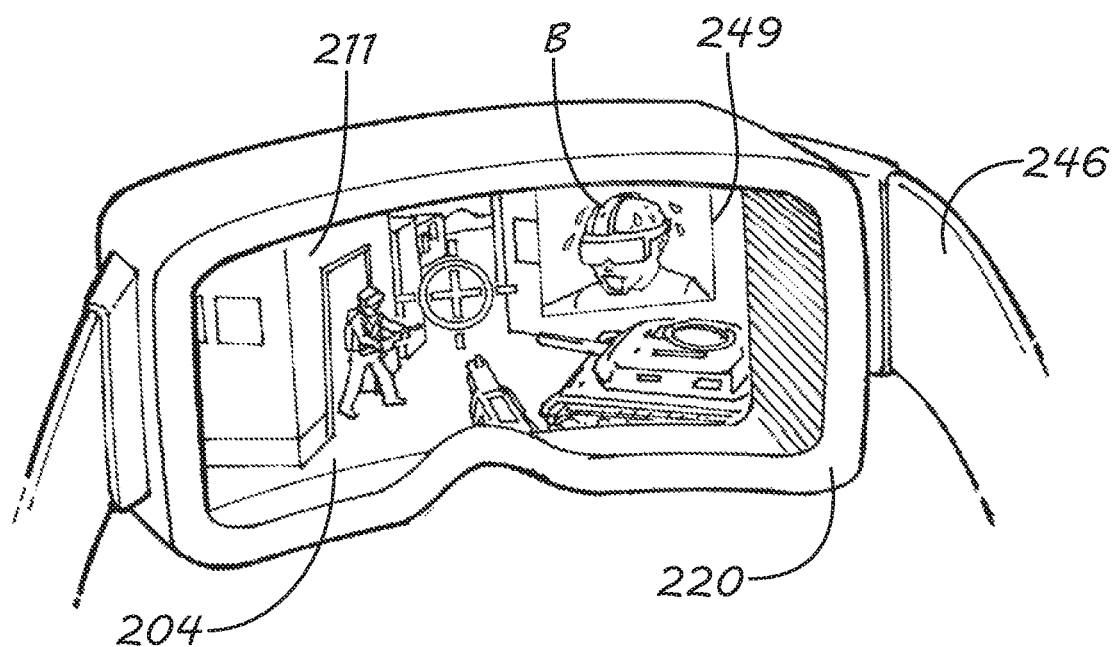
FIG. 18 is an illustration of exemplary eyewear in the form of goggles and illustrating digital images of both the virtual reality experience and also a camera view of an opponent.

FIG. 18 depicts a wearer's view of the screen of an electronic display 204 that might be presented to the wearer of headgear 201. In FIG. 18, the aforementioned wearer, Player A, is not shown. Goggles 220 can include a strap 246. A water reservoir 202 is not shown, but is understood to be coupled to the rest of the headgear 201. A primary image is displayed on the electronic display 204 and said image can change in response to the actions and responses of the player/wearer of the headgear 201, or the actions and responses of other players involved in the gaming experience, or in response to digital programming provided by the software of the digital game. For example, the software can present an image of a forest on the electronic display 204. As the wearer moves around motion sensors in his headgear 201 can signal to the gameset 200 that he is exiting the forest and the electronic display 204 can now present an image of a cityscape. This kind of interactive digital display 204 is well-known to anyone skilled in the art of virtual reality and augmented reality or mixed reality gaming. A second screen 249 (illustrated at the upper right corner of the screen in FIG. 18) could present to the player/wearer of the headgear 201 an actual image of another player/competitor (Player B in FIG. 18) playing the same game. That image 249 could be of an avatar of that other player (Player B), or could be an actual live, transmitted image of Player B, transmitted from a remote digital camera, for example on a laptop computer, of Player B. When that Player B gets water or another liquid 203 released onto his head as a result of the gaming experience as described earlier, the player/wearer of the headset 201 of FIG. 18 could see that occurrence real-time, or could enjoy an image of the avatar of his opponent getting wet.

An avatar is described as: "In computing, an avatar is the graphical representation of the user or the user's alter ego or character. An icon or figure representing a particular person in a video game, Internet forum, etc. It may take either a three-dimensional form, as in games or virtual worlds, or a two-dimensional form as an icon in Internet forums and other online communities. Avatar images have also been referred to as 'picons' (personal icons) in the past, though the usage of this term is uncommon now. It can also refer to a text construct found on early systems such as MUDs. The term "avatar" can also refer to the personality connected with the screen name, or handle, of an Internet user". https://en.wikipedia.org/wiki/Avatar_(computing).

Figure 19:
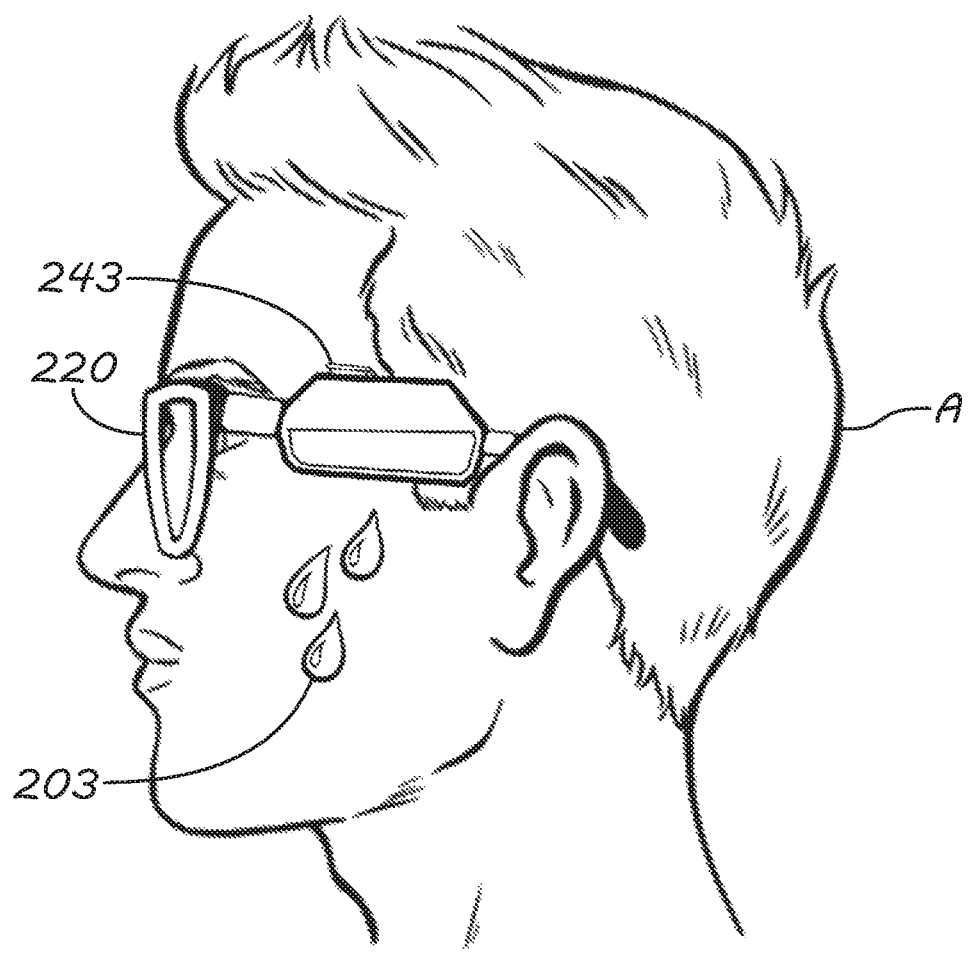
FIG. 19 depicts a minimalistic design for headgear that contains all elements within the design of an enlarged set of special eyeglasses.

FIG. 19 depicts a minimalistic headgear 201 design for the invention. The headgear 201 is basically a set of injection-molded plastic large-framed glasses 220, with the display of images being in the lenses of the glasses 220, the water reservoir 202 being in somewhat larger eyeglass temple pieces, and the electronic componentry as described earlier also being contained, perhaps in the opposite side temple. That would include a small battery, a pc board, etc. As earlier-described in this application, the lens area of the glasses 220 illustrated in this FIG. 19 could be empty or transparent, so that a player (labelled as Player A in FIG. 19) looked through to an electronic display 204 on another device of the gameset 200, or the glasses 220 of this embodiment could simply have a nose-bridge support and not even offer a "lens" area.

Figure 20:
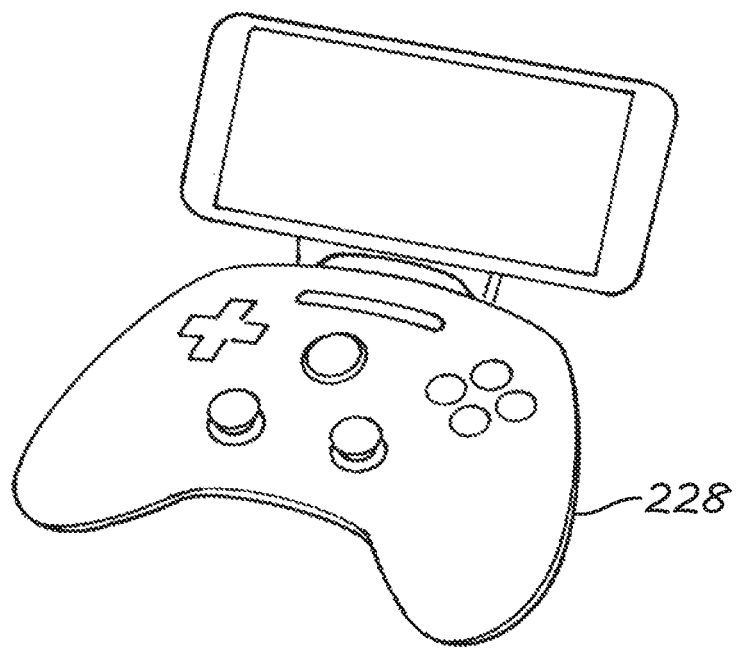
FIG. 20 is an example of a small game console format for a controller of the game system, with a permanent or removably attached electronic display.
Figure 21:
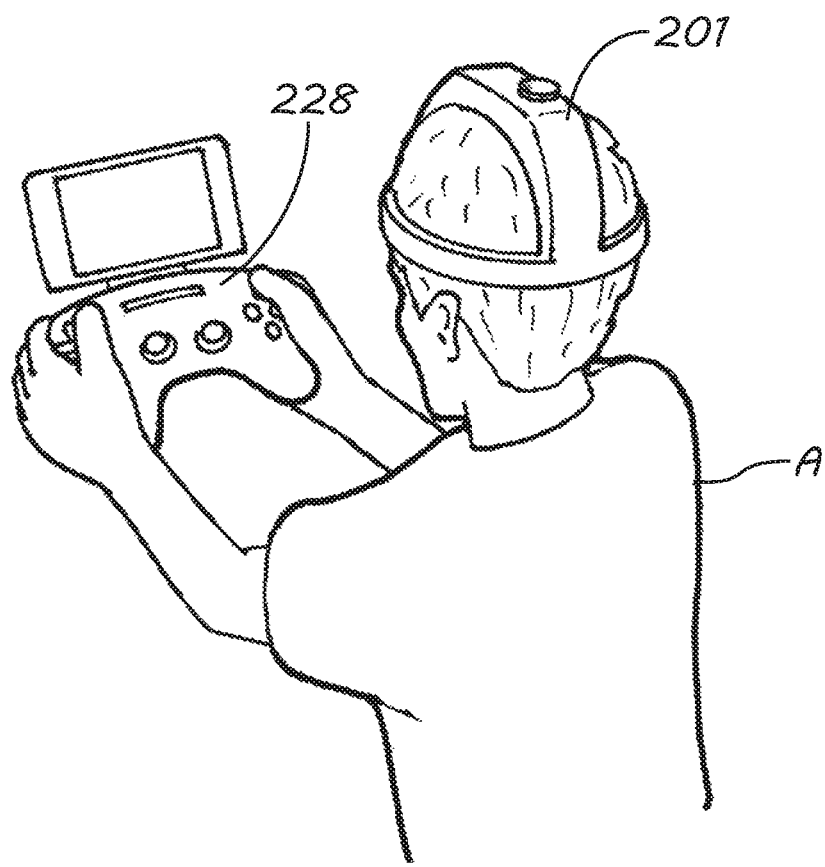
FIG. 21 depicts a wearer of headgears playing a game with the system of the invention employing a handheld console with electronic display.

FIGS. 20 and 21 depict alternative and more classic gaming consoles that could work with the game system of the invention. A small desktop console 228 could provide a dedicated and non-removable screen, or could provide a bracket or slot to removably receive a smartphone 216 onto the desktop console 228 that would display digital images of the game activity. Player A depicted in FIG. 21 could be wire-connected or else wirelessly communicating with the game system console. The release of liquid 203, preferably water, onto the head of a player of the console in FIG. 20 or 21 would be a result of the play scenarios as earlier described. Buttons and joysticks 226 could be included on the console so that the player could manipulate the images onscreen to try to win the game and cause an opponent to get wet, or to avoid himself getting wet, also as earlier described.

Figure 22:
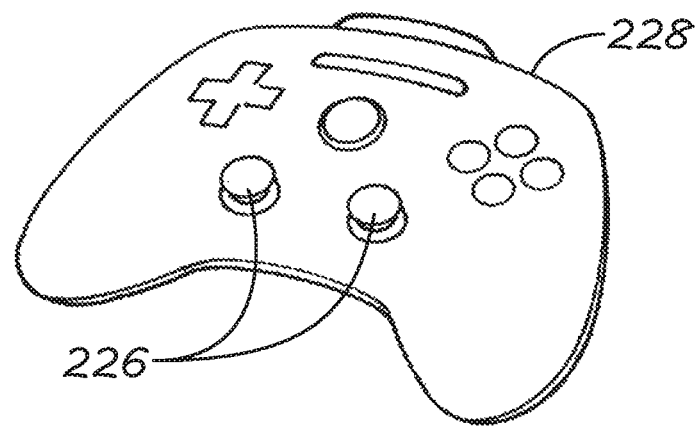
FIG. 22 is a small desk console of the invention.
Figure 23:
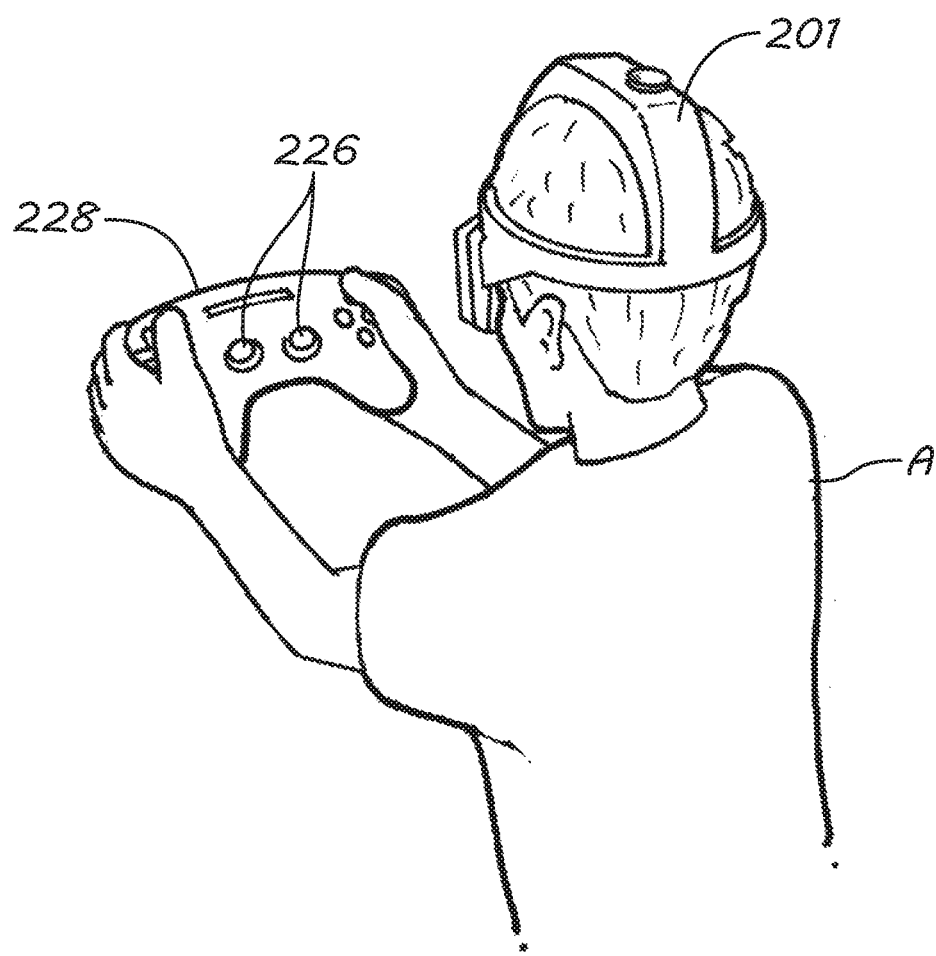
FIG. 23 illustrates an embodiment of the invention in which a player holds a handheld controller-console, and the electronic display is attached to the headgear of the game system.

FIGS. 22 and 23 depict similar consoles of the game system that can be manipulated by a player of the system, except these consoles do not provide electronic display 204 and instead simply provide manipulative input for Player A who is wearing headgear 201 of the gameset 200 that provides that player with digital images directly in his line of sight, either by way of a permanent and dedicated electronic display 204, or by way of the coupling of a smartphone 216 to said headgear 201. Buttons or joysticks 226 are provided for Player A. As earlier described, the display 204 is attached to the headgear 201. Formatting and positioning of the screen in the line of sight of Player A could provide for either virtual reality or augmented reality play experiences. See FIGS. 12 and 13.

While certain exemplary embodiments have been described and shown in the accompanying drawings, it is to be understood that such embodiments are merely illustrative of and not intended to be restrictive on the broad invention, and that this invention not be limited to the specific construction and arrangements shown and described herein, since various modifications may occur to those ordinarily skilled in the art.

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed.

It is not the intent of this patent application to describe or claim a specific display means by which a game system can display an electronic image to a player or players of the invention. Instead it is the expressed intent of the invention disclosed and described herein, by way of example and references to already-known display componentry and embodiments, for example virtual reality and augmented reality displays as well as computer-monitor and smartphone or electronic tablet displays, to provide an entertaining and highly visual "pay-off" event involving the release of a liquid, preferably water, onto the head or heads of players as a result of competitive outcome of digital gaming challenges. Future advances in the technical display of digital images can also benefit from the liquid release event as a result of digital gaming experiences as generally disclosed herein.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

PART LIST

| Part Number | Part |
|---|---|
| 1 | player one |
| 2 | player two |
| 3 | playhat |
| 4 | toy blaster gun |
| 5 | signal beam |
| 6 | electronic signal receiver |
| 7 | water (released) |
| 8 | container |
| 9 | removable cap |
| 10 | retainer strap |
| 11 | water tube |
| 12 | target area |
| 13 | LED |
| 14 | playhat ON switch |
| 15 | trigger |
| 16 | front tip |
| 17 | blaster gun ON switch |
| 18 | hat brim |
| 19 | nozzle |
| 20 | hat cavity |
| 21 | mechanical valve assembly |
| 24 | seated player 01 |
| 25 | seated player 02 |
| 26 | seated player 03 |
| 27 | console |
| 28 | seated player 01 hand |
| 29 | player 01 console button |
| 30 | player 02 console button |
| 31 | player 03 console button |
| 32 | player 04 console button |
| 33 | seated player 25 hand |
| 34 | game table 34 |
| 35 | console ON button |
| 36 | water spray from console |
| 37 | plastic rods |
| 38 | nozzle (console) |
| 39 | turret (console) |
| 40 | playhat circuitry |
| 41 | battery |
| 42 | speaker |
| 43 | circuit board (hat) |
| 44 | LED's |
| 45 | solenoid controller on circuit board |
| 46 | motor |
| 47 | pump |
| 48 | blaster gun circuitry |
| 49 | circuit board (gun) |
| 50 | beam transmitter |
| 51 | signal receiver |
| 52 | hat strap |
| 53 | water container top section |
| 54 | water container bottom section |
| 55 | reservoir bottom |
| 58 | blaster gun housing half |
| 59 | blaster gun housing half |
| 60 | batteries (gun) |
| 61 | electronic circuitry schematic for console |
| 62 | speaker |
| 63 | Console LED lights |
| 64 | Console transmitter |
| 65 | Console circuit board |
| 66 | Console housing top |
| 67 | Console housing bottom |
| 68 | Console Game button switch |
| 69 | Console button switches |
| 70 | console battery door |
| 72 | Console master ON/OFF switch |
| 73 | Console wireless signal transmitter |
| 74 | Console batteries |
| 75 | Console battery contacts |
| 76 | Console integrated circuit board |
| 77 | Console battery door screw |
| 78 | playhat loop fastener strip |
| 79 | playhat hook fastener strip |
| 80 | playhat wireless signal access portal |
| 81 | playhat water tube |
| 82 | playhat solenoid |
| 83 | playhat reservoir bottom water coupling |
| 85 | playhat pivoting valve plate |
| 86 | playhat battery door |

-continued

| Part Number | Part |
|---|---|
| 87 | playhat battery door screw |
| 88 | playhat battery contacts |
| 89 | playhat reservoir bottom hole |
| 90 | playhat flexible seal |
| 91 | playhat target area sidewall. |
| 92 | blaster gun circuitry trigger switch |
| 93 | console speaker |
| 100 | transmitter |
| 101 | handle |
| 200 | Gameset |
| 201 | Headgear |
| 202 | Liquid reservoir |
| 203 | Liquid |
| 204 | Electronic display/Electronic display screen |
| 205 | Receiver |
| 206 | Remote device |
| 207 | Transmitter |
| 208 | Signal |
| 211 | Image |
| 213 | Exit port |
| 216 | Mobile phone |
| 217 | Camera |
| 219 | Transparent or semi-transparent plate |
| 220 | Eyewear |
| 223 | Motion or attitude sensor or accelerometer |
| 226 | Joystick |
| 227 | Keyboard |
| 226 | Controller Unit |
| 229 | Toy blaster gun |
| 230 | Computer mouse |
| 231 | Trigger |
| 232 | Handle |
| 234 | Computer |
| 237 | Valve |
| 243 | Fill port |
| 245 | Bracket |
| 246 | Strap |
| 249 | Second screen |

What is claimed is:

1. A gameset configured to emit a liquid onto a player comprising:
headgear configured to be worn on a head of a player and comprising a liquid reservoir configured to hold a liquid and a valve controlled by a solenoid or by a motor;
a receiver coupled to the headgear;
an electronic display screen to display imagery to said player;
a transmitter to transmit a signal to the receiver; and
one or more power sources configured to power the transmitter, the electronic display screen and the receiver, wherein, upon reception of the signal from the transmitter, the receiver is configured to activate dispensing of liquid from the liquid reservoir onto the player.

2. The gameset of claim 1 wherein the electronic display screen is coupled to a processor.

3. The gameset of claim 1 wherein the electronic display screen is located on a mobile phone, said mobile phone also comprising a microphone, a processor, and a speaker.

4. The gameset of claim 1 wherein the one or more power sources comprises a first power source configured to power the transmitter and a second power source configured to power the receiver.

5. The gameset of claim 1 wherein the gameset comprises one or more buttons or switches configured to be activated by one or more players.

6. The gameset of claim 1 wherein upon reception of the signal from the transmitter, the receiver is configured to cause liquid from the liquid reservoir to be dispensed downward onto the player, said dispensing aided and not hindered by gravity.

7. The gameset of claim 1 wherein the headgear further comprises a fill hole and a cap for sealing the fill hole.

8. The gameset of claim 1 wherein the receiver is located on the headgear.

9. The gameset of claim 1 wherein the transmitter is located in a remote device.

10. The gameset of claim 1 wherein the electronic display screen is located in a remote device.

11. A method of play involving one or more players comprising the steps of;
a) providing the gameset of claim 1;
b) placing the headgear on a player's head;
c) transmitting a signal to the receiver; and
d) dispensing liquid from the liquid reservoir onto the player wearing the headgear in response to the receiver coupled to such player receiving the signal.

12. A method of play involving one or more players comprising the steps of:
a) providing the gameset of claim 1;
b) placing the headgear on a player's head;
c) displaying imagery on the electronic display screen;
d) transmitting a signal to the receiver; and
e) dispensing liquid from the liquid reservoir onto the player wearing the headgear in response to the receiver coupled to such player receiving the signal.

13. The method of claim 12 wherein step e) comprises opening the valve and dispensing liquid downward from the liquid reservoir onto the player wearing the headgear in response to the receiver receiving the signal, said dispensing aided and not hindered by gravity.

14. The method of claim 13 wherein step e) comprises dispensing liquid downward from the liquid reservoir onto the player wearing the headgear without a pump in response to the receiver receiving the signal, said dispensing aided and not hindered by gravity.

15. A method of play involving one or more players comprising the steps of:
a) providing a gameset configured to emit a liquid onto a player, the gameset comprising:
i) headgear configured to be worn on a head of a player and comprising a liquid reservoir configured to hold a liquid and a valve;
ii) a receiver coupled to the headgear;
iii) an electronic display screen to display imagery to said player;
iv) a transmitter to transmit a signal to the receiver; and
v) one or more power sources configured to power the transmitter, the electronic display screen and the receiver,
wherein, upon reception of the signal from the transmitter, the receiver is configured to activate dispensing of liquid from the liquid reservoir onto the player;
b) placing the headgear on a player's head;
c) displaying imagery on the electronic display screen;
d) transmitting a signal to the receiver; and
e) opening the valve and dispensing liquid downward from the liquid reservoir onto the player wearing the headgear in response to the receiver coupled to such player receiving the signal, said dispensing aided and not hindered by gravity.

16. The method of claim 15 wherein the valve is controlled by a solenoid or a motor.

* * * * *